United States Patent
Kaertner et al.

(10) Patent No.: US 10,095,083 B2
(45) Date of Patent: Oct. 9, 2018

(54) METHOD AND APPARATUS FOR GENERATING THZ RADIATION

(71) Applicants: Deutsches Elektronen-Synchrotron DESY, Hamburg (DE); Massachusetts Institute of Technology (MIT), Cambridge, MA (US)

(72) Inventors: Franz X. Kaertner, Hamburg (DE); Damian N. Barre, Hamburg (DE); Michael Hemmer, Hamburg (DE); Giovanni Cirmi, Hamburg (DE); Oliver D. Muecke, Hamburg (DE); Giulio Maria Rossi, Hamburg (DE); Arya Fallahi, Hamburg (DE); Nicholas H. Matlis, Hamburg (DE); Luis E. Zapata, Hamburg (DE); Koustuban Ravi, Hamburg (DE); Fabian Reichert, Hamburg (DE)

(73) Assignees: Deutsches Elektronen-Synchrotron DESY, Hamburg (DE); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/463,717

(22) Filed: Mar. 20, 2017

(65) Prior Publication Data
US 2017/0269455 A1    Sep. 21, 2017

(30) Foreign Application Priority Data

Mar. 21, 2016    (EP) .................................... 16000684

(51) Int. Cl.
*G02F 2/02*    (2006.01)
*G02F 1/355*    (2006.01)
(Continued)

(52) U.S. Cl.
CPC .......... *G02F 1/3551* (2013.01); *G02F 1/3501* (2013.01); *G02F 1/353* (2013.01);
(Continued)

(58) Field of Classification Search
CPC ...... G02F 1/3501; G02F 1/353; G02F 1/3534; G02F 1/3544; G02F 1/3551;
(Continued)

(56) References Cited

U.S. PATENT DOCUMENTS 6,738,397 B2 * 5/2004 Yamamoto ............ G02F 1/3534
359/248
7,054,339 B1 * 5/2006 Hu ........................ G02F 1/3534
372/12

(Continued)

FOREIGN PATENT DOCUMENTS

EP    2309325 A1    4/2011

OTHER PUBLICATIONS

Carbajo et al. (2015). Efficient narrowband terahertz generation in cryogenically cooled periodically poled lithium niobate. Optics letters, 40(24): 5762-5765.

(Continued)

*Primary Examiner* — Rhonda Peace
(74) *Attorney, Agent, or Firm* — Caesar Rivise, PC

(57) ABSTRACT

A method of generating THz radiation includes the steps of generating optical input radiation with an input radiation source device (10), irradiating a first conversion crystal device (30) with the optical input radiation, wherein the first conversion crystal device (30) is arranged in a single pass configuration, and generating the THz radiation having a THz frequency in the first conversion crystal device (30) in response to the optical input radiation by an optical-to-THz-conversion process, wherein a multi-line frequency spectrum is provided by the optical input radiation in the first (Continued)

conversion crystal device (30), and the optical-to-THz-conversion process includes cascaded difference frequency generation using the multi-line frequency spectrum. Furthermore, a THz source apparatus being configured for generating THz radiation and applications thereof are described.

19 Claims, 15 Drawing Sheets

(51) Int. Cl.
G02F 1/35 (2006.01)
G02F 1/39 (2006.01)
(52) U.S. Cl.
CPC .......... *G02F 1/3534* (2013.01); *G02F 1/3544* (2013.01); *G02F 1/3558* (2013.01); *G02F 1/39* (2013.01); *G02F 2001/3548* (2013.01); *G02F 2001/392* (2013.01); *G02F 2201/16* (2013.01); *G02F 2203/13* (2013.01); *G02F 2203/56* (2013.01)
(58) Field of Classification Search
CPC ...... G02F 1/3558; G02F 1/39; G02F 2201/16; G02F 2001/3548; G02F 2001/392; G02F 2203/13; G02F 2203/56
See application file for complete search history.

(56) References Cited

U.S. PATENT DOCUMENTS

| | | | |
|---|---|---|---|
| 7,265,897 B2 * | 9/2007 | Miller .................. | G02F 1/3544 359/326 |
| 7,339,718 B1 * | 3/2008 | Vodopyanov ............. | G02F 1/39 359/326 |
| 7,400,660 B2 | 7/2008 | Wada et al. | |
| 7,764,422 B2 | 7/2010 | Ichikawa | |
| 7,953,128 B2 | 5/2011 | Creeden et al. | |
| 8,305,679 B2 | 11/2012 | Kondo et al. | |
| 8,554,083 B2 | 10/2013 | Breunig et al. | |
| 8,699,124 B2 | 4/2014 | Dunn et al. | |
| 9,118,163 B2 * | 8/2015 | Kim ...................... | H01S 5/0604 |
| 2012/0044959 A1 * | 2/2012 | Zhao .................... | G02F 1/3534 372/10 |
| 2017/0269455 A1 * | 9/2017 | Kaertner ............... | G02F 1/3534 |

OTHER PUBLICATIONS

Chen et al. (2011). Generation of high power tunable multicycle teraherz pulses. Applied Physics Letters, 99(7), 071102: 1-3.
Cronin-Golumb, M. (2004). Cascaded nonlinear difference-frequency generation of enhanced terahertz wave production. Optics letters, 29(17): 2046-2048.
Danielson et al. (2008). Intense narrow band terahertz generation via type-II difference-frequency generation in ZnTe using chirped optical pulses. Journal of Applied Physics, 104(3), 033111: 1-4.
Kawase et al. (2001). Terahertz wave parametric source. Journal of Physics D: Applied Physics, 34: R1-R14.
Kawase et al. (2002). Terahertz wave parametric source. Journal of Physics D: Applied Physics, 35(3): R1-R14.
Klieber et al. (2011). Narrow-band acoustic attenuation measurements in vitreous silica at frequencies between 20 and 400 GHz. Applied Physics Letters, 98(21), 211908: 1-3.
Liu et al. (2013). Coupled-mode theory for Cherenkov-type guided-wave terahertz generation via cascaded difference frequency generation. Journal of Lightwave Technology, 31(15): 2508-2514.
Tripathi et al. (2014). Terahertz wave parametric amplifier. Optics letters, 39(6): 1649-1652.
Vodopyanov, K. L. (2006). Optical generation of narrow-band terahertz packets in periodically-inverted electro-optic crystals: conversion efficiency and optimal laser pulse format. Optics Express, 14(6): 2263-2276.
Vodopyanov et al. (2011). Photonic THz generation in GaAs via resonantly enhanced intracavity multispectral mixing. Applied Physics Letters, 99(4), 041104: 1-3.
Wang et al. (2013). Long-range parametric amplification of THz wave with absorption loss exceeding parametric gain. Optics express, 21(2):2452-2462.

* cited by examiner

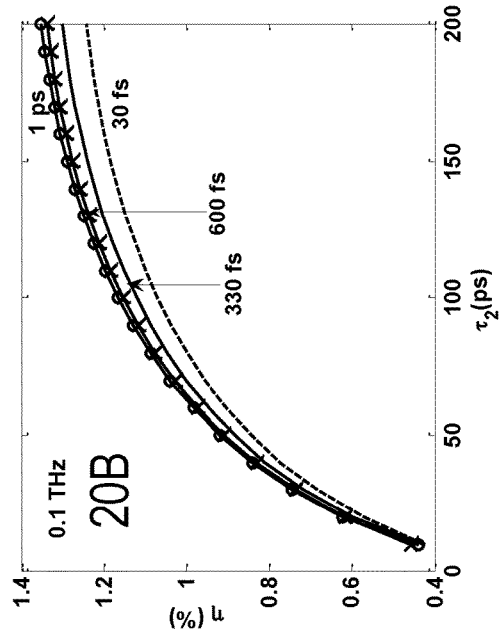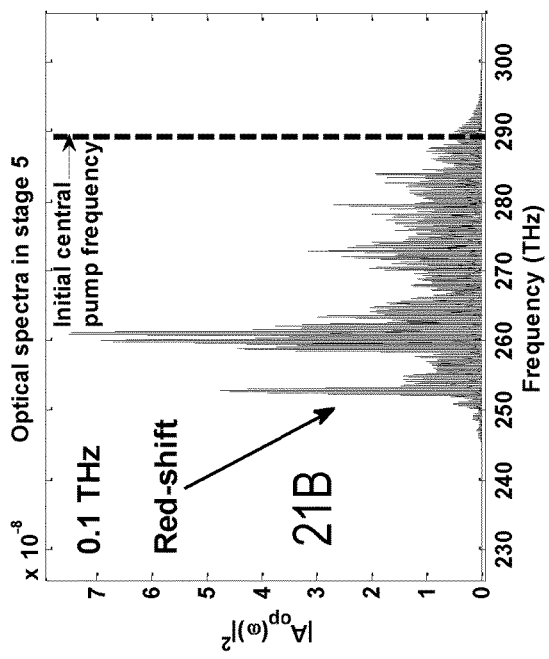
FIG. 20
FIG. 21
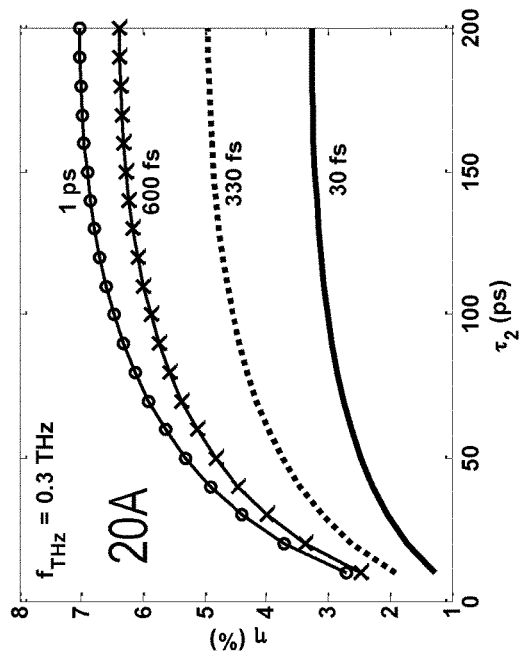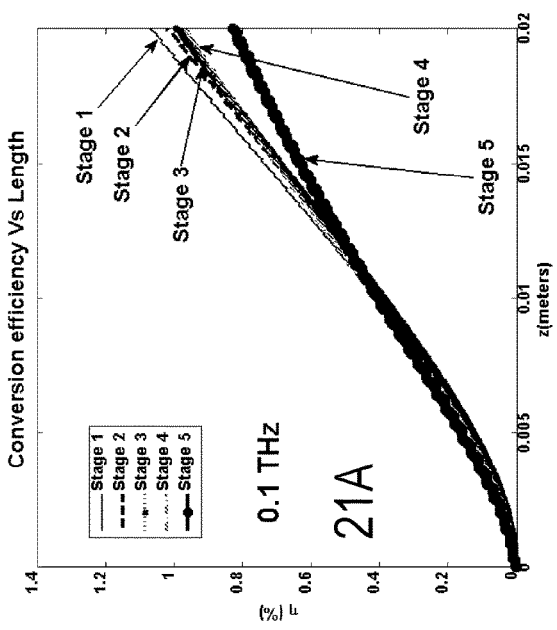

US 10,095,083 B2

METHOD AND APPARATUS FOR GENERATING THZ RADIATION

CROSS-REFERENCE TO RELATED APPLICATIONS

This application claims priority from EP 16 000 684.7 filed Mar. 21, 2016, which is incorporated herein by reference in its entirety.

BACKGROUND OF THE INVENTION

The invention relates to methods of generating THz (terahertz) radiation, in particular by irradiating a conversion crystal device with optical input radiation providing and generating the THz radiation by an optical-to-THz-conversion process. Furthermore, the invention relates to a THz source apparatus, being adapted for generating THz radiation and comprising an input radiation source device and a conversion crystal device for generating the THz radiation by the optical-to-THz-conversion process. Applications of the invention are available in driving strong field processes and especially acceleration of particles. According to a preferred application of the invention, the THz source apparatus is employed in a THz accelerator of charged particles, e.g., electrons.

In the present specification, reference is made to the following publications cited for illustrating prior art techniques.
[1] U.S. Pat. No. 7,764,422 B2;
[2] U.S. Pat. No. 7,400,660 B2;
[3] U.S. Pat. No. 8,554,083 B2;
[4] S. Carbajo et al. in "Optics Letters", vol. 40, p. 5762-5765, 2015;
[5] K. Vodopyanov et al. in "Applied Physics Letters", vol. 99, p. 041104, 2011;
[6] EP 2 309 325 A1;
[7] U.S. Pat. No. 7,953,128 B2.
[8] C. Klieber et al. in "Applied Physics Letters", vol. 98, p. 211908, 2011;
[9] Z. Chen et al. in "Applied Physics Letters", vol. 99, p. 071102, 2011;
[10] S. R. Tripathi et al. in "Optics Letters", vol. 39, no. 6, p. 1649, 2014;
[11] K. Kawase et al. in "Journal of Physics D: Applied Physics", vol. 35, pp. R1-R13, 2002;
[12] U.S. Pat. No. 8,699,124 B2;
[13] U.S. Pat. No. 8,305,679 B2;
[14] T. D. Wang et al. in "Optics Express", vol. 21, no. 2, p. 2452, 2013;
[15] J. R. Danielson, et al. in "Journal of Applied Physics", vol. 104, p. 033111, 2008;
[16] M. Cronin-Golomb in "Optics Letters", vol. 29, no. 17, page 2046, 2004;
[17] K. Vodopyanov et al. in "Optics Express", vol. 14, no. 6, page 2263, 2006; and
[18] L. Pengxiang et al. in "Journal of Lightwave Technology", vol. 31, no. 15, pages 2508-2514, 2013.

It is generally known that THz radiation can be generated with free-electron lasers, vacuum electronic devices, such as gyrotrons, molecular lasers, or photoconductive switches. These techniques have disadvantages with regard to at least one of complexity and costs, limited frequency ranges, low conversion efficiencies, limited THz pulse energy ranges and limited peak power and/or average power ranges. Furthermore, THz radiation can be generated with laser-based approaches which use laser pulses from an input radiation source to pump a nonlinear crystal with non-zero second order nonlinearity and generate THz radiation via an optical-to-THz-conversion process, including difference-frequency-generation (DFG) or optical rectification. DFG employs two distinct narrowband input lasers for THz generation, while optical rectification is based on a single broadband input pulse creating THz radiation by intra-pulse DFG in periodically poled crystals.

Proposals for low power terahertz generation systems based on the optical-to-THz-conversion process have been described e.g., in [1], [2] and [3]. However, these systems have not so far generated THz radiation with 10 MW to GW peak powers and mJ to several mJ pulse energies as required e.g. for particle accelerator applications. The best optical to THz energy conversion efficiencies (or energy conversion efficiency or conversion efficiency) reported with the conventional laser-based THz generation methods is 0.1% [4]. Limitations for scaling conversion efficiencies to higher levels mainly result from details of the employed input radiation source, the nonlinear crystals and the optical-to-THz-conversion processes as described in the following.

Firstly, high energy laser sources for scaling conversion efficiencies with sufficient 0.1 kHz to few kHz repetition rates of interest and Joule level pulse energies are most accessible with wavelengths below 1.1 µm, e.g., 1.1 µm to 800 nm. However, a common feature of nonlinear crystals conventionally used for laser-based THz generation, like e.g., Gallium Arsenide (GaAs), Gallium Phosphide (GaP), other semiconductor materials or organic materials, is the requirement of input radiation sources of wavelengths greater than 1.3 µm. In particular, GaAs with a bandgap energy of 1.42 eV and GaP or Zinc Telluride (ZnTe) with bandgap energies of 2.26 eV are unrealistic candidates for scaling THz energies and conversion efficiencies since they are prone to multi-photon absorption of 1 µm/800 nm lasers. It is extremely challenging to engineer laser sources at the 1.3 µm or longer wavelengths producing a fraction of 1 J, let alone more of pump energy.

Phase-matching or velocity matching in the nonlinear crystal is required for efficient THz generation. Conventionally employed phase-matching techniques comprise phase-matching of the optical input and THz radiation by e.g., tilted-pulse-front technique, quasi phase-matching, and waveguide based phase matching. Limitations for scaling conversion efficiencies exist in particular for the tilted-pulse-front technique having a high complexity for high energy pump pulses and the waveguide based phase matching using engineering the phase velocity of the THz radiation. In particular, as waveguide dimensions have to be on the order of the THz wavelength (about mm), waveguide structures (in particular optical fibers) cannot be pumped by Joule level optical pulse energies due to damage limitations.

Conventional input radiation sources for pumping the nonlinear crystal and generating THz radiation by DFG use e.g., two or more quasi-monochromatic lasers having frequencies that are separated by the THz frequency to be generated and having synchronized laser pulse repetition rates and phases. However, applications of these input radiation sources using at least two lasers have been limited to low power THz generation systems.

An example of optical rectification with intra-pulse DFG is described in [4]. As schematically illustrated in FIG. 26 (prior art), a single pass configuration is provided, wherein optical input radiation, like e.g., a single broadband laser pulse, from an input radiation source 10' is imaged with an imaging system 20' into the nonlinear crystal 30', where the THz radiation is generated by a single passage of the optical input radiation. The input radiation source 10' includes an ultra-short pulsed mode-locked oscillator, which is amplified to high energies, typically of several mJ at kHz repetition rates by using state-of-the art solid-state amplifiers. However, even by cryogenic cooling and optimization of the pulse bandwidth, conversion efficiency is limited to the 0.1% for terahertz generation in periodically poled lithium niobate crystals (PPLN) [4].

Numerical simulations of the conversion efficiency as a function of transform limited pulse duration of the pump laser for various terahertz frequencies in cryogenically cooled Lithium Niobate (with quasi phase matching period of crystal optimized for this THz frequency) show that the peak conversion efficiency occurs at shorter transform limited pulse durations for larger THz frequencies. This is natural since THz radiation is basically generated by beating of spectral components of the optical spectrum. At long pulse durations, there is not enough spectral content for efficient generation of the higher terahertz frequencies. However, in practice obtaining compressed pulses smaller than 500 fs at joule level pump energies and high repetition rates is very challenging and virtually unprecedented. Practically, ps long pulses are more feasible at high pulse energies. However, in this parameter range, the conversion efficiency is well below the 1% level.

As an alternative, THz generation can be based on conventional DFG using optical parametric oscillators (devices based on cavities) (OPO) specifically close to degeneration [6]. However, this also places limitations on the optical-to-THz energy conversion efficiency. According to [5] and as schematically shown in FIG. 27 (prior art), a series of frequency lines was generated with an input radiation source 10' including an optical parametric amplifier to generate THz radiation in the nonlinear crystal 30' made of GaAs using light at wavelengths between 1.3 and 2 µm. The nonlinear crystal 30' is arranged in a resonant cavity 20' creating multiple passages of the optical input radiation in the nonlinear crystal 30'. The disadvantages with this approach are firstly that lower repetition rates on the order of kHz are hard to realize using an OPO configuration. Furthermore, this demonstration produced only 200 µW of average THz power for 20 to 30 W of average optical pump power. This corresponds to low conversion efficiencies on the order of 0.001%. Finally, the resonant cavity 20' restricts the range of optical pump frequencies which can be used for THz generation. This is because the cavity shall be stable only for a small set of frequencies. This limits the optical-to-THz energy conversion thus achieved. Therefore, even if the challenge of producing high energy Joule-level 2 µm optical input radiation were to be solved, the approach is fundamentally limited in its conversion efficiency.

Another parametric amplifier system using terahertz as a seed in a non-collinear phase matched generation process in bulk lithium niobate crystals pumped by a 1.064 µm optical pump source at room temperature (i.e. 300 K) was demonstrated, producing 10 nJ THz pulses ([10], [11], [12], and [13]). The optical-to-THz energy conversion efficiencies of such configurations are very low due to the pJ to nJ level THz seed. Secondly, the non-collinear configuration is experimentally tedious. Thirdly, the use of a THz seed offers limited possibilities in achieving high conversion efficiencies since THz seed energies of high value are hard to obtain. In [14], OPA behavior in periodically poled lithium niobate was studied (but not demonstrated) under conditions of large absorption (corresponding to room temperature operation) for generation at the 0.1% level or within the Manley-Rowe limit.

A THz generation system using difference frequency generation with one of the pump signals generated by an optical parametric oscillator scheme was introduced [7]. Multiple terahertz generation stages were included providing multiple DFG stages driven by OPO sources. However the construction of many OPO's is cumbersome and impractical.

Finally, with a chirp and delay approach, an ultrafast broadband optical pulse is chirped, split into two and then re-combined with a relative delay to generate an interferometric pattern tuned to the desired terahertz frequency. This technique has been demonstrated in ZnTe [15] and also for the tilted-pulse-front technique in lithium niobate [9]. For ZnTe, the conversion efficiency was about 0.0003%. However as discussed, ZnTe does not lend itself to being amenable for scaling to very high conversion efficiencies due to its incompatibility with the most probable 800 nm/1 µm laser technology. Furthermore, as discussed the tilted-pulse-front technique has fundamental limitations which prevent its use with high energy beams.

Further studies of THz generation based on DFG are described in [16] and [17], wherein the DFG process is based on two lines of equal strength. Furthermore, if $\omega_P$ is the frequency of the pump photon and $\omega_{THz}$ is the frequency of the generated terahertz frequency, the cascaded DFG regime obtained by [16] has a conversion efficiency of $$\eta = N \frac{\omega_{THz}}{\omega_P},$$

with maximum N, that can be theoretically achieved is around 2 only.

According to the THz generation described in [18], Cerenkov phase-matching is employed, which is intrinsically non-collinear and involves multiple reflections of the generated THz wave. Thus, [18] does not use a single-pass device. This is particularly true since [18] uses a nonlinear process, where the THz wave is first generated, it then propagates non-collinearly, reflects off the walls of the slab and then re-joins the propagating optical field in the crystal. The model that is used to describe the system is in fact an approximation which might not hold in a dramatically cascaded regime. Furthermore, the waveguide like geometry used in [18] induces significant dispersion, limiting the cascading process. Secondly, absorption of terahertz will also limit the extent of cascading. The spectrum described here once again involves 2 lines of equal strength.

OBJECTS OF THE INVENTION

Objectives of the invention are to provide an improved method and an improved apparatus for generating THz radiation being capable of avoiding limitations of the conventional techniques. In particular, the THz radiation is to be generated with increased THz output energy and/or conversion efficiency and/or THz peak power compared with conventional laser-based THz generation techniques.

These objectives are solved by a method of generating THz radiation and a THz source apparatus of the invention.

SUMMARY OF THE INVENTION

According to a first general aspect of the invention, the above objective is solved by a method of generating THz radiation, comprising the steps of generating optical input radiation, irradiating a first conversion crystal device with the optical input radiation, wherein the first conversion crystal device is arranged in a single pass configuration, and generating the THz radiation having a THz frequency in the first conversion crystal device in response to the optical input radiation by an optical-to-THz-conversion process. According to the invention, the optical input radiation is generated such that an optical radiation field having a multi-line frequency spectrum is provided in the first conversion crystal device and the multi-line frequency spectrum is used for a cascaded difference frequency generation of the THz radiation. The multi-line frequency spectrum comprises frequency lines with separation equal to the THz frequency to be generated. The linewidth of each line is smaller than the THz frequency to be generated.

According to a second general aspect of the invention, the above objective is solved by a THz source apparatus, being adapted for generating THz radiation, comprising an input radiation source device being arranged for generating optical input radiation, optionally an imaging system, and at least one conversion crystal device (first conversion crystal device) being arranged to be irradiated with the optical input radiation. The input radiation source device, the optional imaging system and the first conversion crystal device are arranged in a single pass configuration for generating the THz radiation having a THz frequency in response to the optical input radiation by an optical-to-THz-conversion process. According to the invention, the input radiation source device and the first conversion crystal device are configured such that an optical radiation field having a multi-line frequency spectrum is provided by the optical input radiation in the first conversion crystal device and the optical-to-THz-conversion process includes cascaded difference frequency generation of the optical input radiation using the multi-line frequency spectrum.

Advantageously, the generated THz radiation comprises narrowband (multi-cycle), in particular even continuous THz radiation, or broadband (single or few cycle) THz radiation. The THz radiation preferably comprises electromagnetic radiation spanning the frequency range in particular from 100 GHz (or 0.1 THz) to 3000 GHz (or 3 THz). The THz radiation preferably has THz pulse output energies at the milli-Joule (mJ), at least 1 mJ to several mJ level, e.g., 10 to 100 mJ. As an important advantage, the invention allows to replace the complex free-electron lasers by a compact and low cost source that can achieve high energy, high power THz pulses.

The optical-to-THz-conversion process in the first conversion crystal device is a cascaded difference frequency generation of the multi-line frequency spectrum. Cascading refers to the generation of the further lines and changing in the position of spectrum towards lower frequencies as more THz radiation is generated. The generation of terahertz radiation is a considered as a marker for cascading. Using the multi-line spectrum provided as the initial spectrum, additional lines are generated at high conversion efficiencies, e.g., for 5% conversion efficiency at 0.3 THz, at least 50-lines (see in particular FIG. 22B), by stepwise beating of lines of the multi-line spectrum and/or created lines of the multi-line spectrum. The number of generated lines depends on the conversion efficiency and the THz frequency thus generated. So far, a practical design enabling such drastic cascading or change in position of the spectrum and generation of such large number of lines has not been devised. This is important for the generation of significantly higher conversion efficiencies compared to prior approaches. The use of a multi-line pulse format also helps alleviate laser induced damage.

Contrary to the technique of [4], which uses a single-pass configuration for THz generation with optical rectification of a single broadband pulse as the optical input radiation, and contrary to the technique of [5], which uses conventional DFG of a multi-line input radiation in a multi-pass configuration, the invention uses the cascaded difference frequency generation on the basis of the multi-line frequency spectrum. The optical input radiation comprised of the multi-line frequency spectrum includes a plurality of frequencies separated by the frequency of the THz radiation to be generated or multiples thereof. The number of lines is at least two, preferably at least three and from practical standpoint less than 10. However, these numbers represent non-restricting examples only. In practice, the number of lines may depend on frequency and further operational parameters, and the number of lines can be larger than 10, e.g., up to 20 or more, e.g., up to 100.

As an advantage, with the cascaded DFG, the fraction of the optical pump energy converted to terahertz energy can greatly exceed the ratio of their photon energies (Manley-Rowe limit). This has not been obtained with conventional techniques using non-cascaded DFG. For example, in the generation of 0.3 THz radiation pumped by 300 THz, the ratio of the photon energies is $10^{-3}$ which corresponds to an energy conversion efficiency η of 0.1%. Non-cascaded DFG would be fundamentally limited to values less than or approximately 0.1%, while cascaded DFG significantly exceeds these values by repeatedly down-converting the optical photon to terahertz photons. Preferably, if $\omega_P$ is the frequency of the pump photon and $\omega_{THz}$ is the frequency of the generated terahertz frequency, the cascaded DFG regime obtained by the invention has a conversion efficiency of $$\eta = N \frac{\omega_{THz}}{\omega_P},$$

with N≥5, e.g., at least 5, preferably at least 10. The value of N specified above as per conversion efficiency is distinguished from the number of additional stokes or anti-stokes optical lines, previously observed or reported as cascading. It is theoretically possible to obtain dramatic generation of secondary red/blue-shifted lines without any generation of terahertz radiation. While, here cascading of the optical spectrum occurs, it is not accompanied by commensurate growth of terahertz radiation. Therefore, the shifting of optical lines is accompanied with terahertz generation. In prior art techniques, this is not the case, which might explain the poor efficiencies obtained in prior art.

Entering the cascaded DFG regime to significantly exceed the Manley-Rowe limit and providing the above conversion efficiency preferably is obtained by selecting (a) sufficient low dispersion in the optical frequency range, (b) sufficient low absorption for optical and terahertz frequencies (c) sufficient overlap of optical and terahertz radiation as well as (d) suitable pump spectrum and intensity in the conversion crystal device. These conditions are satisfied by the choice of pump wavelength(s), input optical spectrum, terahertz frequency and phase-matching geometry, resulting in a positive feedback effect and the cascaded DFG.

The multi-line frequency spectrum may be self-generated via cascaded optical parametric amplification (in the following: first embodiment of the invention). In this case, the lines of the multi-line frequency spectrum are created in the first conversion crystal device by a cascade of beating steps creating additional lines with frequencies obtained by beating optical frequencies and/or THz frequencies included in the optical input radiation or created with preceding beating steps of the cascade. Advantageously, during the passage of the optical input radiation through the first conversion crystal device, the multi-line frequency spectrum is broadened by the cascaded generation of additional lines and the THz generation is increased due to the occurrence of the multiple lines of the multi-line frequency spectrum in the first conversion crystal device.

Alternatively, the multi-line frequency spectrum may be directly provided by a temporal multi-line pulse format of the optical input radiation and optionally further broadened by beating of lines of the multi-line frequency spectrum (in the following: second embodiment of the invention), including the THz frequency and multiples thereof. Advantageously, during the passage of the optical input radiation through the first conversion crystal device, the THz generation is increased as all lines of the temporal multi-line pulse contribute to the THz generation.

With both embodiments, the efficiency of the THz generation can be essentially increased, in particular to a range of 5 to 10% optical-to-THz energy conversion efficiency and 1 to 100 mJ THz energy or higher. This provides a substantial improvement as a technical solution which would result in 5 to 10% level optical-to-THz energy conversion efficiencies is not available with the conventional laser based techniques, particularly at high optical input energies. Furthermore, the provision of the multi-line frequency spectrum allows the creation of the optical input radiation with input radiation source devices including more feasible optical pump lasers and allowing substantial scaling towards higher input energy and power. As a further advantage, the THz source apparatus can be provided with a compact structure and economic operation.

According to the first embodiment of the invention, the optical input radiation preferably comprises a first radiation component (or: pump radiation, pump pulses) with a spectral content including an optical frequency and a second radiation component (or: seed radiation, seed pulses) with a spectral content including an optical frequency or a THz frequency of the THz radiation to be generated. The optical frequency of the second radiation component is separated from the optical frequency of the first radiation component by the THz frequency of the THz radiation to be generated. The first and second radiation components are coupled into the first conversion crystal device with a mutual spatial and temporal overlap along the beam path through the first conversion crystal device. Preferably, the first and second radiation components are coupled simultaneously or with a relative delay into the first conversion crystal device, wherein the delay is selected such that the spatial and temporal overlap of the components is still possible. In particular in contrast to [10], the multi-line frequency spectrum is provided by cascaded beating frequencies derived from the optical frequency of the first radiation component and the optical or THz frequency of the second radiation component.

The first embodiment employs cascaded optical parametric amplification (COPA), which is distinguished from conventional optical parametric amplification (OPA) for a few reasons. In conventional optical parametric amplification (OPA), the highest frequency wave in a three wave interaction involved in a DFG process is of significantly higher intensity (known as the pump) compared to the rest. Under this initial condition, the growth of the other two lower frequency waves associated with the DFG process is exponential with respect to propagation length. On the contrary, in COPA, there is no requirement for the highest frequency wave to be of the highest intensity. This is because upon the onset of cascading, multiple frequency lines will be generated and the initial conditions are 'washed out'.

Furthermore, in general COPA is a multi-triad wave mixing process as opposed to a mere 3 wave mixing process in conventional OPA, where for a total of N waves there are N!/(3!(N−3)! (where ! corresponds to factorial) triads. Here a triad corresponds to a set of three waves involved in the DFG process. Thus, employing parametric amplification allows to use a single strong quasi-continuous wave (CW) optical pump and a weak seed (either THz or optical), with as low as only 0.1% of the energy of the pump to generate THz radiation at very high efficiencies of up to 10%. Advantageously, the development of a single quasi-CW or CW optical pump source at the Joule level is more easily accessible compared to the laser sources conventionally used, making this first embodiment highly attractive.

With a preferred variant of the first embodiment, the first radiation component and the second radiation component irradiate the first conversion crystal device with a collinear geometry. Advantageously, this results in an optimization of the spatial and temporal overlap of the first and second radiation components along the whole length of the first conversion crystal device.

If the second radiation component has an optical frequency, the input radiation source device preferably comprises two laser sources being locked to each other and generating the first radiation component and the second radiation component, respectively. Advantageously, multiple combinations of laser sources are available, which can be used for creating the optical input radiation. Preferably, the laser sources include two continuous wave laser sources, two quasi-continuous wave laser sources (in particular creating 100 ps to 10 ns pulses), one continuous wave laser source and one quasi-continuous wave laser source, two pulse laser sources (creating 10 fs to 100 ps pulses), one broadband chirped pulse laser source combined with a pulse stretcher, and one pulse laser source, one of both being combined with a relative delay unit, or two broadband chirped pulse laser sources, being combined with a relative delay unit. In summary, different variants exist for the pump or seed components (CW, Quasi-CW, chirped pulses), so that in total 3*3=9 variations for the system are permissible.

If the second radiation component has a THz frequency, the input radiation source device preferably is adapted for generating the THz frequency by optical rectification of a single ultrashort optical pulse in a pump conversion crystal device, cascaded parametric amplification using the first and second radiation components, or optical rectification of a sequence of multiple pulses in a pump first conversion crystal device. Advantageously, available THz sources can be used for providing the THz frequency of the second radiation.

According to a particularly preferred implementation of the first embodiment, the laser sources generate the first radiation component and the second radiation component with different output power, wherein a fraction of the weaker output power to the stronger output power is larger than 0.01%, in particular larger than 0.1%, and smaller than 50%. With a preferred example, the first radiation component is a strong (relative to the second radiation component) optical pump radiation at an optical frequency $f_1$ and the second radiation component is a weak (relative to the first radiation component) seed (either optical or THz). The seed can be even 1000 times smaller than the pump in energy. The seed and pump are involved in an initial DFG process to generate photons at the THz frequency $f_{THz}$ and $f_2=f_1-f_{THz}$, thus amplifying both $f_{THz}$ and $f_2$. Then subsequently, the process cascades, i.e. $f_3=f_2-f_{THz}$, $f_4=f_3-f_{THz}$ are generated, all the while amplifying the THz wave in the first conversion crystal device at $f_{THz}$. In the regime the initial growth of the terahertz intensity is exponential rather than quadratic with respect to length as is the case with conventional DFG.

According to the second embodiment of the invention, the optical input radiation preferably comprises a temporal sequence of optical laser pulses (pulse train) having a temporal separation ($\Delta t$) equal to an integer multiple of a reciprocal of the THz frequency of the THz radiation to be generated ($\Delta t = N \cdot 1/f_{THz}$, $N=1, 2, \ldots$) and the multi-line frequency spectrum is directly provided by the optical input radiation.

Preferably, the input radiation source device generates the sequence of optical laser pulses with a spatial length equal to or larger than a longitudinal length of a beam path of the optical laser pulses through the first conversion crystal device. Advantageously, this allows an efficient conversion of the optical input radiation into THz radiation. Alternatively, the pulse train can be shorter than the beam path through the first conversion crystal device.

Particularly preferred, the first conversion crystal device comprises a periodically poled nonlinear crystal comprising a sequence of alternatingly oriented crystal domains, wherein a domain period $\Lambda$ of the periodically poled nonlinear crystal is equal to $c/(f_{THz}|(n_{THz}-n_g)|)$, where c is the speed of light, $f_{THz}$ is the generated THz frequency, $n_g$ is the group velocity of the optical input radiation and $n_{THz}$ is the THz refractive index at the THz frequency thus generated. Advantageously, this increases the efficiency of THz generation.

According to the second embodiment of the invention, the input radiation source device preferably comprises an ultrashort pulse laser oscillator having a pulse repetition rate at the THz frequency of the THz radiation to be generated, a multi pulse generator generating a sequence of pulses, in particular splitting and stacking incoming optical pulses, or an optical pulse inter-leaver, or pulse shaper, in particular based on chirp and delaying an optical pulse.

The first conversion crystal device comprises a single bulk crystal, a stack of periodically poled crystal layers (periodically poled crystal) or an arrangement of multiple crystal layers separated from each other. The periodically poled crystal has a periodic poling, wherein the sign of the effective second order nonlinear susceptibility $\chi^{(2)}$ is periodically, in particular alternatingly inversed. Preferably, the first conversion crystal device has a beam path length along the travel direction of the optical input radiation of at least 5 mm and/or at most 10 cm. Particularly preferred, the first conversion crystal device has at least one of the following features.

The first conversion crystal device can be adapted for quasi phase matching (QPM), in particular by bonding of wafers with periodically inverted crystal layer axes or by stacking several smaller periodically poled crystal layers. For joule-class optical input radiation, large apertures may be provided by bonding of periodically rotated wafers which invert the relevant crystal axis to also produce an inversion of nonlinearity. QPM is known as such in nonlinear optics to increase the efficiency of nonlinear frequency generation processes using pump lasers. In particular, QPM has advantages for generating narrowband THz radiation. In QPM, the optical input radiation is incident on the first conversion crystal device to generate the THz radiation at a well-defined frequency. This is achieved by using a crystal that consists of domains with alternating signs of second order nonlinearity with a QPM period $\Lambda = c(f_{THz}(n_{THz}-n_g))^{-1}$ that specifically allows a particular THz frequency $f_{THz}$ to be generated. Here, $n_{THz}$ is the terahertz refractive index, $n_g$ is the group refractive index of the optical pump laser, and c is the speed of light in vacuum.

In particular, the first conversion crystal device can be adapted for quasi phase matching with gradually varying quasi phase matching period along the beam path. Advantageously, this allows an increase of conversion efficiency.

Alternatively, the first conversion crystal device can be adapted for regular phase matching being phase-matched for the THz frequency of the THz radiation to be generated.

If the first conversion crystal device comprises an arrangement of multiple crystal layers separated from each other, the crystal layers preferably are arranged at the Brewsters's angle relative to the optical input radiation. Accordingly losses of optical input radiation can be minimzed.

A plurality of materials are available, which can provide the first conversion crystal device as a bulk crystal or a periodically poled crystal. The choice of nonlinear material is dependent on the optical input radiation wavelength and other material properties such as damage threshold, nonlinear properties and availability of sufficient crystal apertures. Preferred materials comprise congruent Lithium Niobate (cLN) or stoichiometric Lithium Niobate (sLN), congruent Lithium Tantalate (cLT) or stoichiometric Lithium Tantalate (sLT), Potassium Titanyl Phosphate (KTP), potassium titanyl arsenate (KTA), Zinc Germanium Phosphide (ZGP), Cadmium Silicon Phosphide ($CdSiP_2$), and Gallium Phosphide (GaP). The materials can include one or more dopants, like e.g., Magnesium Oxide (MgO), Iron (Fe), Hydrogen (H), Chromium (Cr), or Rubiudium (Rb), which have an effect on the nonlinear properties of the crystal, in particular for reducing parasitic nonlinear effects or increasing damage threshold.

Among the above examples, congruent and stoichiometric Lithium niobate and congruent and stoichiometric lithium tantalate (optionally with one or more of dopants, like Magnesium oxide, Iron, or Chromium) are particularly preferred for increasing the conversion efficiency. With a very large bandgap of 4 eV, they are completely compatible with relatively easily accessible 1 J level pulse energies available from recent 1 µm laser technology and off-the-shelf 800 nm Ti:Sapphire technology. Moreover, they possess superior nonlinear properties, specifically, a second order nonlinearity 3 times that of GaAs and 6 times that of GaP. In addition, it possesses additional advantageous properties such as much smaller nonlinear refractive index compared to GaAs (100 times lower), GaP (10 times lower) and ZnTe (10 times lower). Lithium niobate or lithium tantalate crystals can be used in form of congruent and stoichiometric crystals. KTP and KTA with the optional Rubidium dopants are also preferred with 1 µm/800 nm lasers and may possess better damage properties relative to cLN/SLN but slightly inferior nonlinear properties.

According to a further preferred feature of the invention, the first conversion crystal device (and any further conversion crystal device in multistage configurations) can be cooled with a cooling device, preferably to a temperature below 150 K. Cooling is preferred in particular for lithium niobate or lithium tantalate crystals. Other materials, like Gallium Phosphide, Cadmium Silicon Phosphide ($CdSiP_2$) can be used without cooling.

Further advantages of the invention can be obtained with a multistage THz generation, wherein at least one further conversion crystal device arranged at an output side of the first conversion crystal device is irradiated with at least one of the optical input radiation and the THz radiation output from the foregoing conversion crystal device. THz radiation is generated in the at least one further conversion crystal device in response to the optical input radiation by the optical-to-THz-conversion process, including the cascaded difference frequency generation. The further conversion crystal device preferably has at least one of the features of the first conversion crystal device. Advantageously, the multistage THz generation provides a further increase of the conversion efficiency and/or output power of THz radiation. Preferably, the first conversion crystal device and the at least one further conversion crystal device are adapted for quasi phase matching, wherein the first conversion crystal device and the at least one further conversion crystal device have different quasi phase matching periods.

A further advantage of the inventive THz source apparatus results from the broad range of applications thereof, e.g., in driving high energy terahertz guns and electron accelerators for coherent X-ray generation (for pharmaceutical manufacturers, university labs, lithography, phase contrast imaging for medical systems) or for imaging and medical therapy, imaging (for fault detection for instance), coherent diffractive imaging, spectroscopy, sensory applications, particularly the explosive detection small angle X-ray scattering, THz or Optical pump and X-ray probe time resolved spectroscopy, X-ray pump and X-ray probe time resolved spectroscopy, directional wireless communication, radar technique, driving of highly correlated quantum systems into new phases, driving of quantum information devices with transitions in the THz range, and/or using it as an electromagnetic undulator.

BRIEF DESCRIPTION OF THE DRAWINGS

Further details and advantages of the invention are described in the following with reference to the attached drawings, which show in:

FIGS. 18 to 22 simulation results obtained with the inventive THz source apparatus 100 of FIG. 14;

DETAILED DESCRIPTION OF PREFERRED EMBODIMENTS

The invention is described with reference to the first and second embodiments of providing the multi-line frequency spectrum by the optical input radiation in the first conversion crystal device. As the physics of the optical-to-THz-conversion process using cascaded difference frequency generation using the multi-line frequency spectrum is equal in both embodiments, features described with reference to the first embodiment can be used with the second embodiment and vice versa.

Details, e.g., of the input radiation source device, the optical input radiation, the imaging system and the first or further conversion crystal device(s) can be selected on the basis of practical tests or numerical simulations as described below. In particular, the results of the numerical simulations can be directly used for designing the inventive THz source apparatus. It is emphasized that the practical implementation of the invention is not restricted to the described examples, but rather possible with modified features.

The invention is described in particular with regard to the provision of the optical radiation field having the multi-line frequency spectrum in the conversion crystal(s) and the cascaded THz generation. Details of the invention, like e.g., details of phase-matching, are not described if they are known as such from prior art.

First Embodiment of the Invention

Features of the first embodiment of the invention are described with reference to FIGS. 1 to 13.

Figure 1:
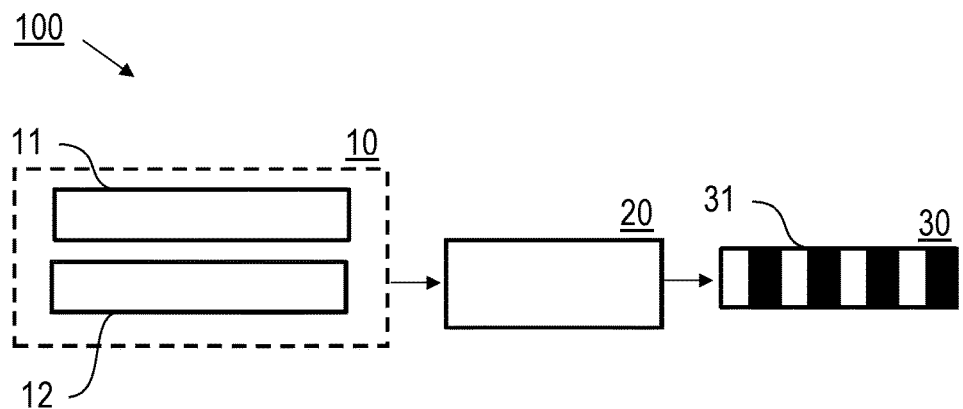
FIG. 1: a schematic illustration of the first embodiment of creating THz radiation according to the invention, including two optical sources.

FIG. 1 shows a schematic of the THz source apparatus 100 comprising an input radiation source device 10 for generating optical input radiation, an imaging system 20 and a first conversion crystal device 30 for THz generation. The input radiation source device 10 comprises of a pump system with an optical pump source 11 creating a first radiation component and an optical seed source 12 creating a second radiation component. In this case, the THz source apparatus 100 is called Type O THz-COPA. In an alternative case (see FIG. 7), a THz seed source 13 is employed, and the THz source apparatus 100 is called Type T THz-COPA. Various possible implementations for the optical pump source 11 and optical seed source 12 are described below.

The imaging system 20 (details not shown) comprises refractive and/or reflective optics as well as a beam combiner unit, e.g., based on a dichroic beam combiner, which are configured for superimposing the first and second radiation components and collimating, focusing or diverging them into the first conversion crystal device 30. Preferably, the imaging system 20 contains a vacuum based imaging system to eliminate aberrations from the beam.

The first conversion crystal device 30 comprises e.g., a nonlinear crystal 31, which is a quasi-phase-matched (QPM) crystal, for example periodically poled Lithium Niobate (PPLN) or a regular phase matched crystal with favorable nonlinear parameters, phase-matched for the requisite THz frequency. For Joule level optical input radiation which is available in the about 800 nm/1 μm wavelength region, congruent/stoichiometric lithium niobate and congruent/ stoichiometric lithium tantalate with dopants are suitable for high efficiency THz generation. In addition, Potassium Titanyl Phosphate (KTP) available with periodic poling (PP-KTP) and Potassium Titanyl Arsenate (PPKTA) with Rubidium dopants are also viable solutions at these frequency ranges. Furthermore, when longer wavelength Joule class lasers used, the nonlinear crystal 31 can be made of other materials, such as Zinc Germanium Phosphide (ZGP) and Cadmium Silicon Phosphide ($CdSiP_2$). Further details of manufacturing quasi-phase-matched (QPM) crystals are described below with reference to FIGS. 23 to 25.

A number of methods exist for the implementation of the input radiation source device 10. As a first example, two continuous wave lasers 11, 12, one of high power and the other of significantly lower power, separated by the desired THz frequency can be locked to each other. As a second example, quasi-CW waves with pulse durations ranging from some 100 ps to nanoseconds, with center frequencies separated by the THz frequency may be used. As a third example, the input radiation source device 10 comprises broadband pulses (transform limited durations of 10 fs to 100 ps) optical pump and seed sources 11, 13. Within this variant of the invention, there exists a number of approaches, like (i) generation of transform limited pulses (with their center frequencies separated by the desired THz frequencies; (ii) generation of chirped broadband pulses with center frequencies separated by the desired THz frequency, which can also be overlapped to mimic the situation of using two transform limited narrowband pulses (chirp and no-delay approach, CANDy); or (iii) generation of chirped broadband pulses with the appropriate amount of relative delay such that one of them is of much weaker intensity than the other can also be used. This is similar to a chirp and delay approach (see FIG. 3) but differs significantly in that one of the pulses is of significantly low energy.

Figure 2:
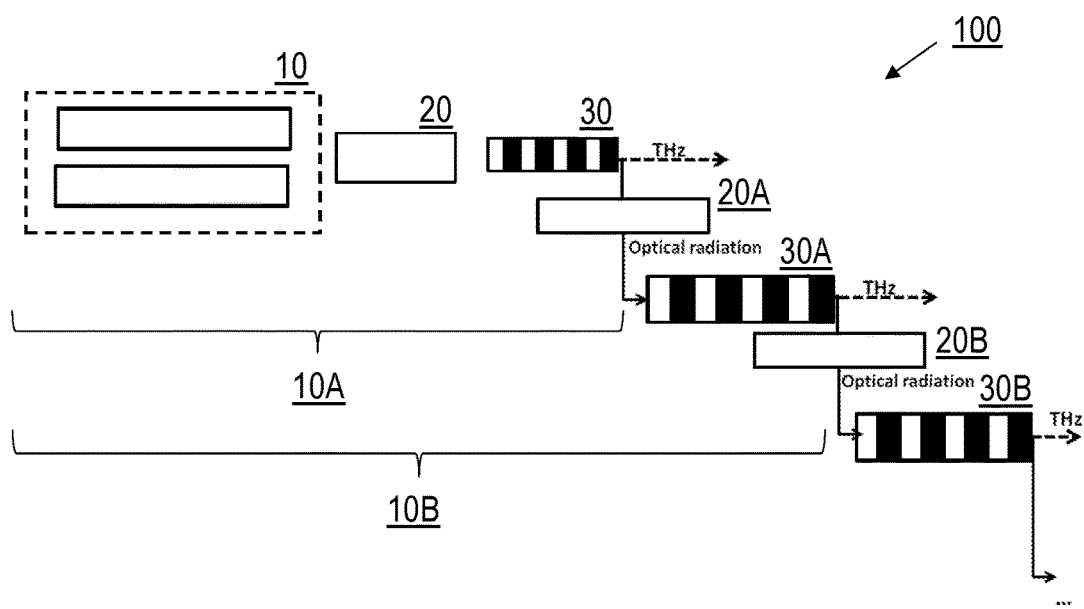
FIG. 2: a schematic illustration of a multi-stage variant of the first embodiment according to FIG. 1.

The THz source apparatus 100 can be provided with a multistage configuration as shown in FIG. 2. The first stage including the input radiation source device 10, the imaging system 20 and the first conversion crystal device 30 is structured as described above with reference to FIG. 1. A second stage comprises the first stage as input radiation source device 10A, a second imaging system 20A and a second conversion crystal device 30A. Every further stage, e.g., the third stage as shown, comprises the preceding stage as input radiation source device, e.g., 10B, a further imaging system, e.g., 20B, and a further conversion crystal device, e.g., 30B. The imaging systems and the conversion crystal devices can be configured as described above with reference to FIG. 1. The THz radiation output at each stage is combined for providing the THz output of the multistage THz source apparatus 100. Alternatively, THz radiation output at each stage is used in another channel. Advantageously, the multistage configuration can be used to boost the conversion efficiencies to high levels.

Figure 8:
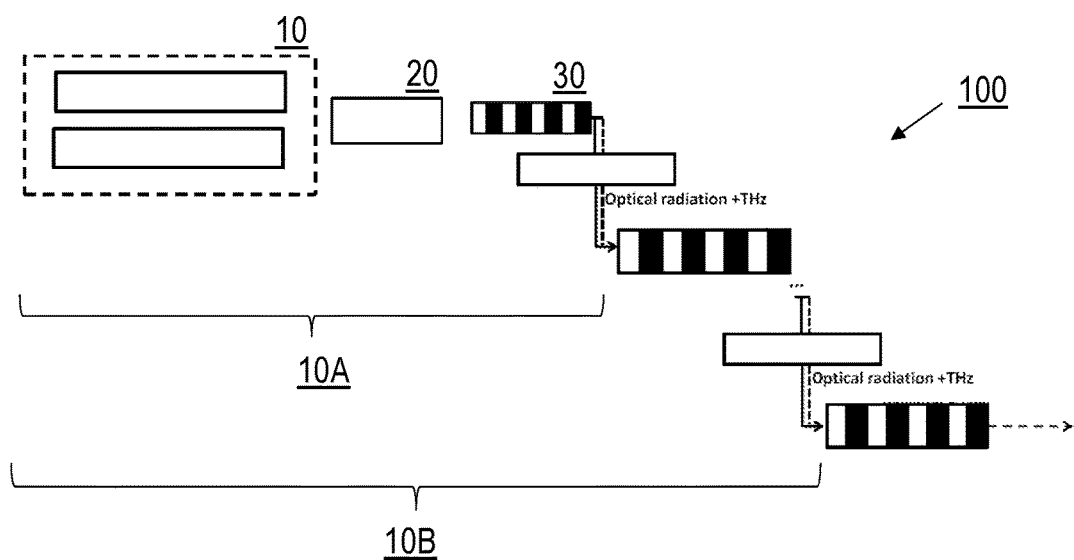
FIG. 8: a schematic illustration of a multi-stage variant of the first embodiment according to FIG. 7.

Alternatively, both the generated THz radiation and optical pump radiation can be re-phased by delaying them with respect to each other and injected into a second and each further stage. The process can be repeated and terahertz can be extracted in the Nth stage as shown in FIG. 8.

During the cascading cycles, the optical spectrum downshifts significantly and due to material dispersion the phase matching conditions change which limits the number of cascading cycles and, therefore, limits the achievable THz conversion efficiency. Therefore, THz generation can be dispersion limited at very high conversion efficiencies. This can be circumvented by gradually varying the period of the QPM crystals 30, 30A, 30B, . . . along the propagation length. Alternatively, when the multiple stages are employed, each stage can contain a crystal with a different optimal QPM periods.

Figure 3:
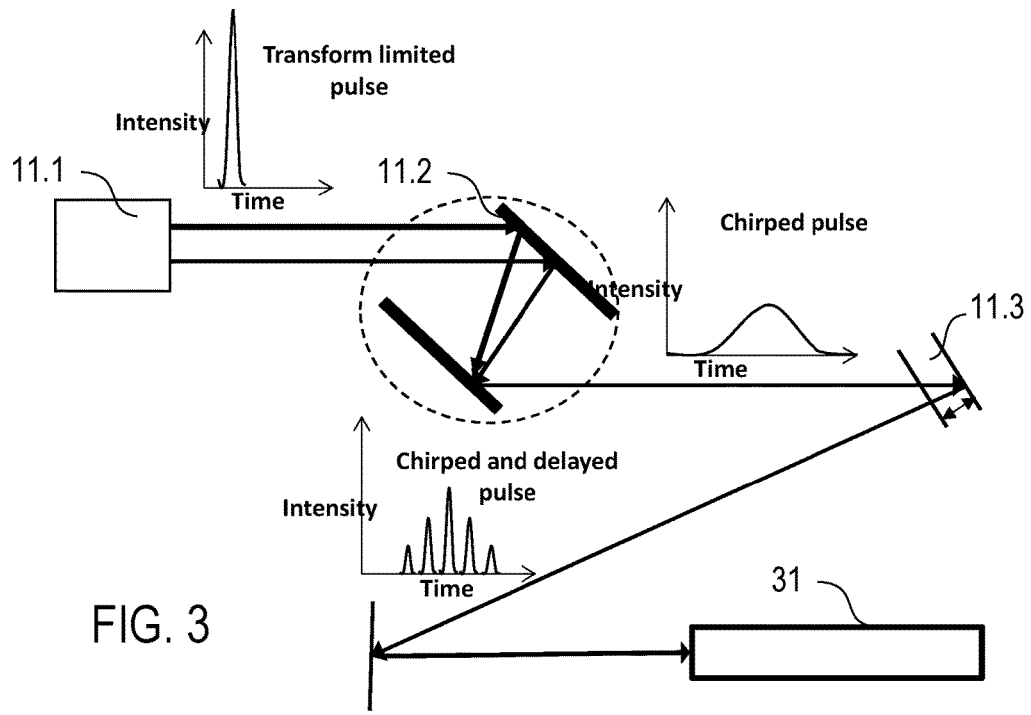
FIG. 3: further details of an input radiation source device.

The above variant of providing the optical input radiation with the input radiation source device 10 based on a chirp and delay approach is illustrated with an example in FIG. 3. The input radiation source device 10 includes a fs laser source 11.1, a grating stretcher 11.2, and a set of partially reflecting mirrors, in particular an etalon 11.3. For instances two pulses with very short pulse durations, e.g., 30 fs, can be first stretched with the grating compressor 11.2 by adding a chirp to long durations. These chirped pulses can be relatively delayed with the etalon 11.3, resulting in the formation of a chirped pulse including multiple frequency lines, which is input to the nonlinear crystal 31. In addition, one may also use two chirped pulses with their center frequencies separated by the requisite THz frequency. In this case, there is no mandatory need for a delay (CANDy). The setup of FIG. 3 represents an example only. It can be modified, e.g., by using beam splitters.

Figure 4:
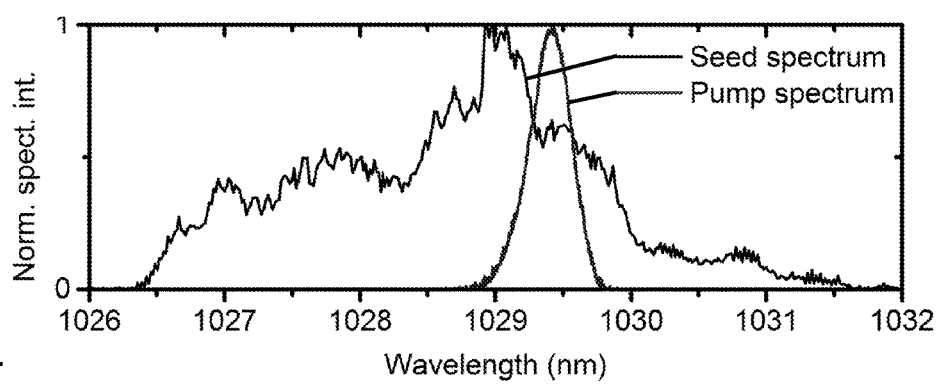
FIGS. 4 to 6: practical results obtained with the inventive THz source apparatus 100 of FIG. 1.
Figure 6:
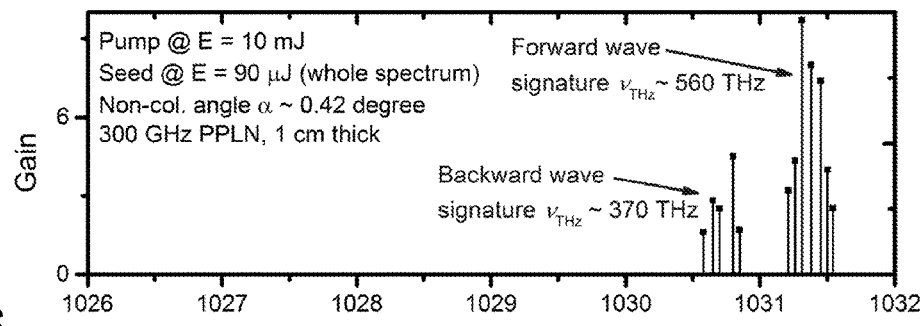
Figure 5:
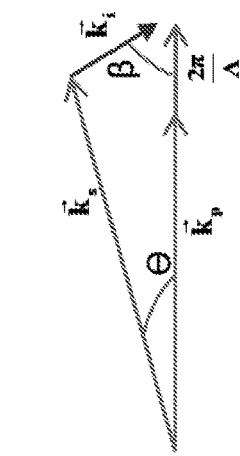
Figure 5:
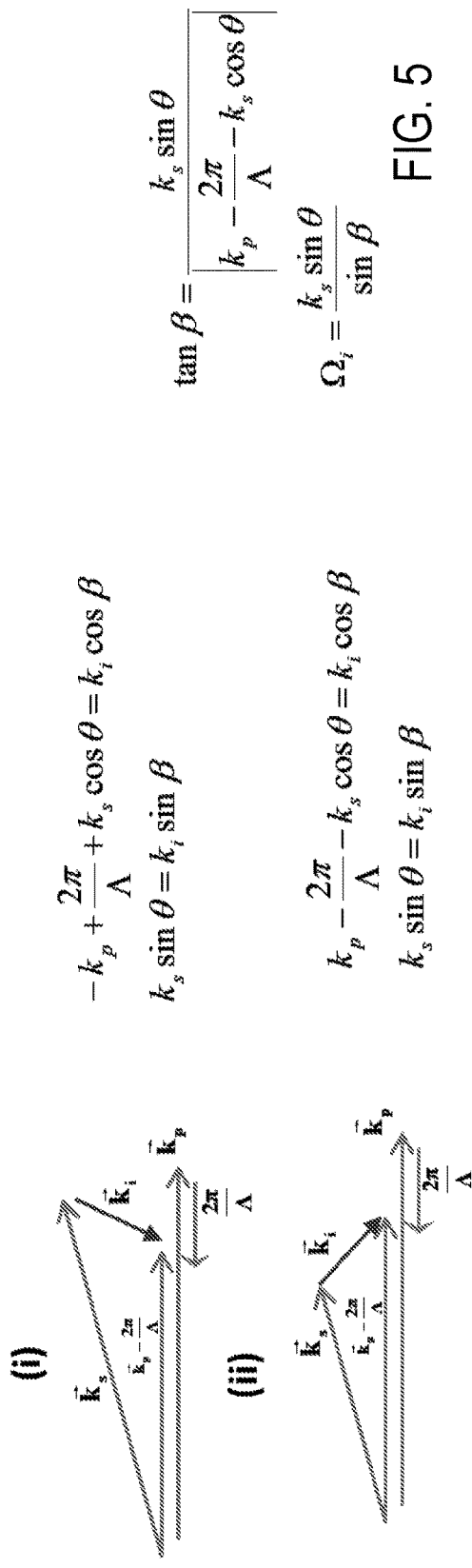

FIGS. 4 to 6 illustrate exemplary practical results obtained from the inventive THz source apparatus 100, wherein FIG. 4 shows the experimental optical pump and seed spectra, FIG. 5 shows phase-matching diagrams for various non-collinear phase-matching possibilities, and FIG. 6 shows experimental evidence of forward and backward phase-matched THz waves due to amplification of optical spectra at two different frequencies corresponding to different phase-matched conditions.

THz source apparatus 100 used for obtaining the results of FIGS. 4 to 6 includes an optical pump source 11 comprising a laser emitting pump pulses (first radiation component) with a pulse duration of 0.25 to 0.3 ns, a center wavelength of 1029.5 nm, an energy of 15 mJ and a repetition rate of 0.1 kHz, and an optical seed source 12 comprising a laser emitting seed pulses (second radiation component) with a pulse duration of 0.25 to 0.3 ns, an effective center wavelength of 1031.25 nm, an energy of 200 pJ and a repetition rate of 0.1 kHz. Both of the optical pump source 11 and the optical seed source 12 are synchronized so that the pump and seed pulses are overlapped in the nonlinear crystal 31. The nonlinear crystal 31 is a 1 cm long QPM structure based on periodic poling of lithium niobate with a grating period 212 μm at 300 K.

In a first test an optical seed is launched at an angle θ=0.42 degrees with respect to the pump. The non-collinearly phase-matched THz frequency can be generated as either backward propagating or forward propagating as depicted in the various phase-matching diagrams in FIG. 5. Two distinct THz generation frequencies will be phase-matched depending on whether the condition satisfies class 1 or class 2 phase-matching in FIG. 5. The fact that two possible THz frequencies can be generated is experimentally observed in FIG. 6, where different delays produce two different phase-matched THz generation frequencies. In a further test, both optical seed and pump are launched into a quasi-phase-matched crystal 31 collinearly, again resulting in THz generation.

Figure 7:
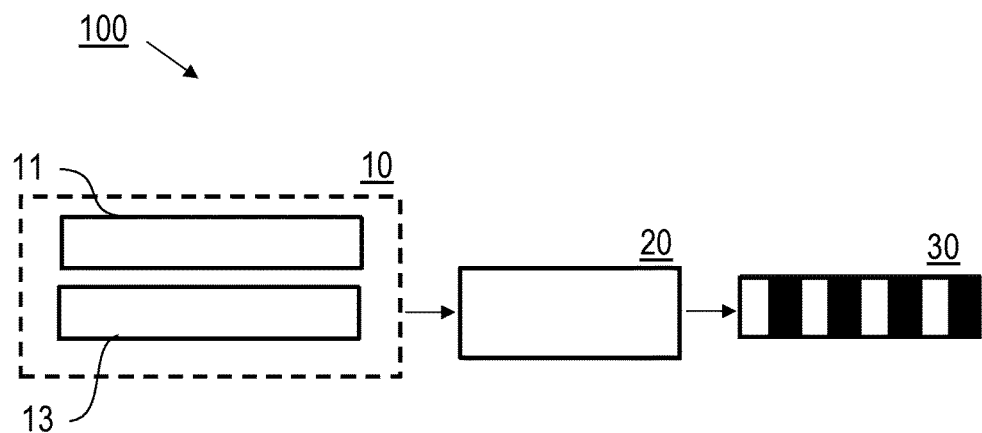
FIG. 7: a schematic illustration of the first embodiment of creating THz radiation according to the invention, including an optical source and a THz source.

According to FIG. 7, the THz source apparatus 100 comprising the input radiation source device 10 for generating optical input radiation, the imaging system 20 and the first conversion crystal device 30 for THz generation. Deviating from FIG. 1, the input radiation source device 10 includes a THz seed source 13, emitting THz pulses with a frequency equal to the frequency of the THz radiation to be created.

With a practical example, the optical pump source 11 and the THz seed source 13 locked to each other comprise a quasi-CW pump laser and a quasi-CW THz source. The optical pump source 11 creates quasi-CW optical pulses, 100 ps to several nanosecond long, and the THz seed source 13 creates multi-cycle THz pulses. The optical source maybe a CW, a transform-limited (or compressed) pulsed, a broadband stretched pulse, a sequence of pulses separated by multiples of the inverse of the THz frequency (obtained through chirp and delay, multiple lines or pulse trains), or quasi-CW source. The THz may be a CW, quasi-CW, multi-cycle (10's of cycles obtained by optical rectification of an ultrashort laser pulse) or obtained from the first or second embodiment.

The THz source apparatus 100 of FIG. 7 also can be provided with a multistage configuration as shown in FIG. 8. In this case, both of the optical and THz radiation from a preceding stage are input to a subsequent stage. As described above with reference to FIG. 2, the first stage with the input radiation source device 10, the imaging system 20 and the first conversion crystal device 30 provides the input radiation source device 10A of the second stage etc.

Numerical Simulations of the First Embodiment

Numerical simulations of the first embodiment have been conducted using the following model formulation. In general, the electric field of an optical longitudinal mode at frequency $\omega_m = \omega_0 + m\Omega_0$, where $\omega_0$ is the central optical angular frequency and $\Omega_0$ is the generated THz angular frequency is given by $E_m = A_m e^{-jk_m z}$. Here, $A_m$ is the envelope of the $m^{th}$ longitudinal mode and $k_m$ is the wave number of the $m^{th}$ longitudinal mode in the nonlinear medium. The evolution of the envelop $A_m$ is m given by Eq. (1).

$$\frac{dA_m}{dz} = \frac{-j\omega_m}{2cn(\omega_m)}[A_{m-1}A_{THz}e^{-j(k_{m-1}+k_{THz}-k_m)z} + A_{m+1}A^*_{THz}e^{-j(k_{m+1}-k_{THz}-k_m)z}] \quad (1)$$

The first term on the RHS of Eq. (1) is sum frequency generation between the red-shifted optical frequency component $A_{m-1}$ and the THz field. The second term on the RHS of Eq. (2) is due to difference frequency generation between the blue-shifted optical frequency component $A_{m+1}$ and the THz field.

Similarly, Eq. (2) describes the evolution of the THz field envelope $A_{THz}$.

$$\frac{dA_{THz}}{dz} = -\frac{\alpha}{2}A_{THz} - \frac{j\Omega_0}{2cn_{THz}}\sum_{m=1}^{N} A_{m+1}A^*_m e^{-j(k_{m+1}-k_m-k_{THz})z} \quad (2)$$

The first term on the RHS of Eq. (2) corresponds to THz absorption and the second term corresponds to an aggregate of all difference frequency generation processes between optical frequency components.

Numerical simulations of the conversion efficiency of a THz source apparatus 100 according to FIG. 1 have been done as illustrated in FIGS. 9 to 12, assuming center wavelengths of the input radiation source device 10 around 1 μm, a QPM Lithium Niobate crystal 31, and continuous pump, seed and THz waves. A second order nonlinear coefficient of $$\chi^{(2)} = \frac{2}{\pi}336$$

pm/V is assumed, with the factor of $2/\pi$ resulting from the QPM structure's periodicity. The refractive index data for the materials accounting for full dispersion of THz and optical waves is based on literature data.

Figure 10:
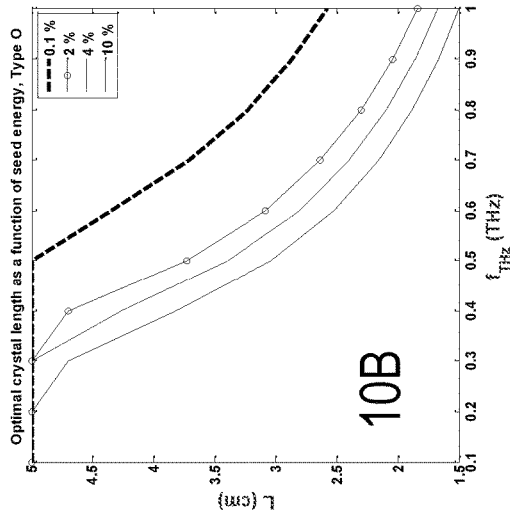
FIGS. 9 to 13: simulation results obtained with the inventive THz source apparatus 100 of FIG. 1.
Figure 9:
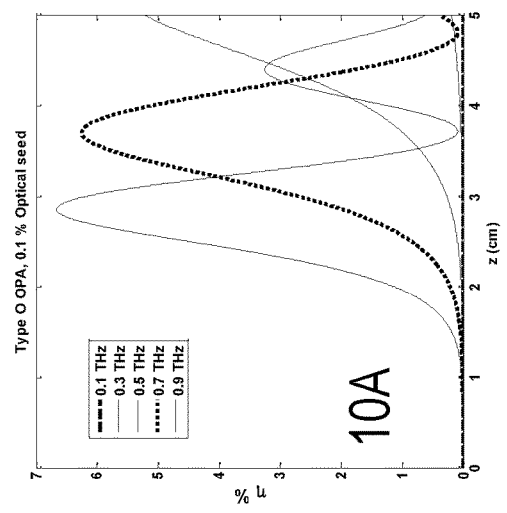
Figure 9:
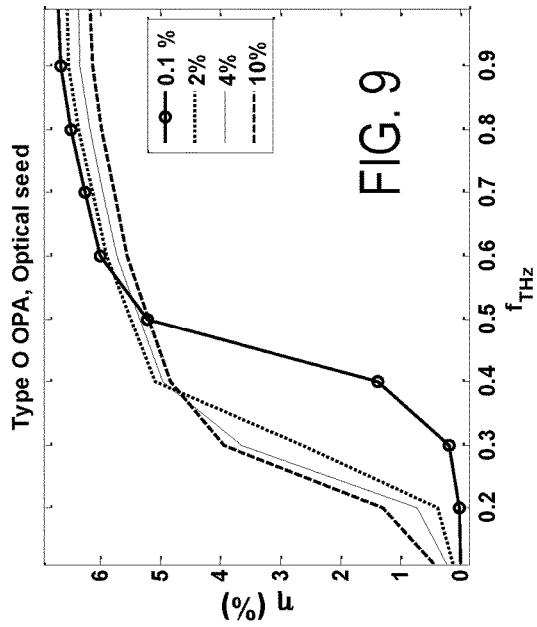

Simulations of the embodiment of FIG. 1 (Type O THz-COPA) are illustrated in FIGS. 9 and 10. For these simulations, a strong optical pump pulse has been assumed centered at 1030 nm, and the injected optical seed is downshifted in frequency by the desired THz generation frequency. The crystal 31 is phase matched for that THz frequency and optical pump frequency. The percentage of energy in the seed is varied and is limited to be no larger than 10% of the pump energy. Thus, if 1 J of energy is used as an optical pump, then at most 100 mJ of seed is assumed. Such a system is within the realm of feasible laser technology. The pump fluence is limited to be a factor of 2 smaller than the damage fluence, i.e. about 1.5 J/cm². The crystal 31 is assumed to be at cryogenic temperatures of 100 K. The crystal length is restricted to be no longer than 5 cm.

FIG. 9 shows a peak conversion efficiency as a function of THz frequency for various initial optical seed energies, wherein the seed energy is represented as a fraction of the energy in the pump. FIG. 10A shows the conversion efficiency as a function of length for various THz frequencies, assuming only 0.1% of the energy in the seed, wherein the drop in conversion efficiency beyond a certain length is attributed to phase-mismatch caused by dispersion. FIG. 10B shows the optimal crystal lengths as a function of THz frequency for various seed levels.

From FIG. 9, it is seen that the initial seed value does not influence the peak conversion efficiency much. This is because cascading of the optical spectrum occurs, at which point the initial conditions are no longer relevant. The peak conversion efficiencies increase with frequency but show an eventual saturation. The saturation of conversion efficiency is owed mostly due to dispersion. At high conversion efficiencies, the broadened optical spectrum is no longer well phase-matched to the generated THz radiation, leading to a decline in conversion efficiency beyond a certain length as shown in the plot of conversion efficiency as a function of length for a seed ratio of 0.1% in FIG. 10A. The maximum conversion efficiency occurs at shorter lengths for higher frequencies, which is in agreement with the understanding of conventional OPA's. The optimal crystal lengths as a function of frequency and initial seed energy are plotted in FIG. 10B. Here, it is shown how higher seed energies and THz generation frequencies reduce the required crystal length. Furthermore, using these calculations, it is shown how conversion efficiencies of >5% can also be achieved using a relatively easily accessible 1 J quasi-CW pulse as a pump. If damage constraints are relaxed, then even higher conversion efficiencies, approximately scaling with the fluences are achieved.

Figure 11:
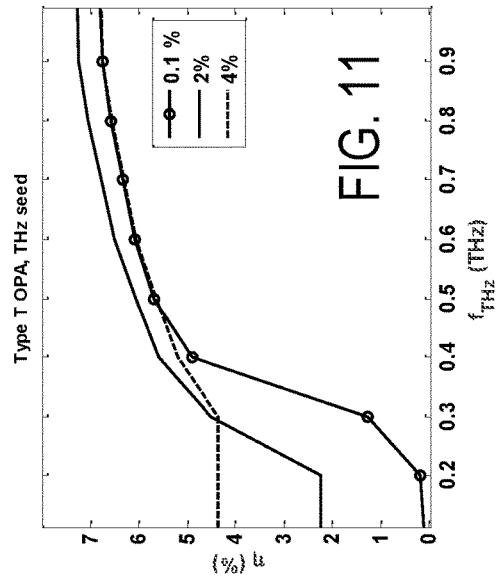
Figure 12:
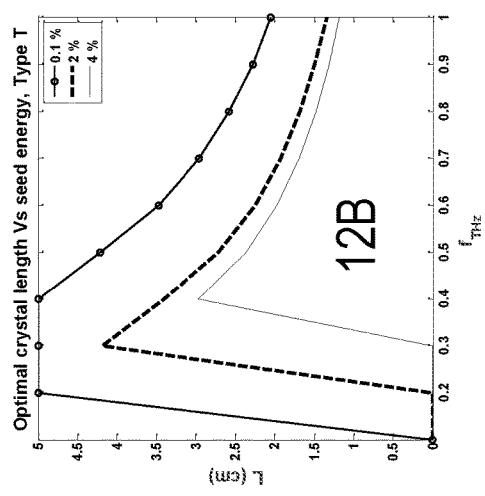
Figure 12:
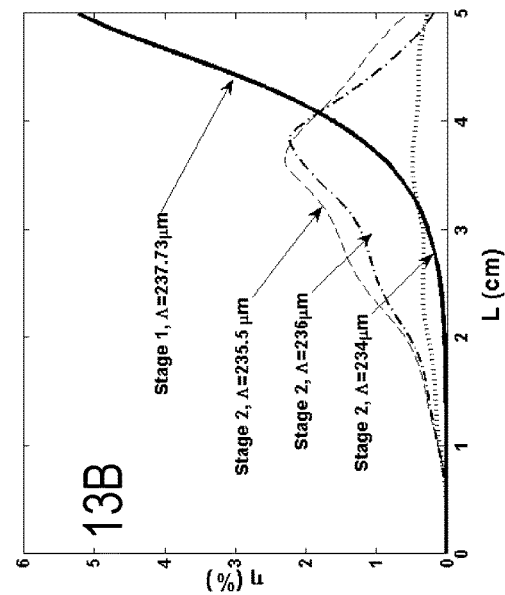
Figure 13:
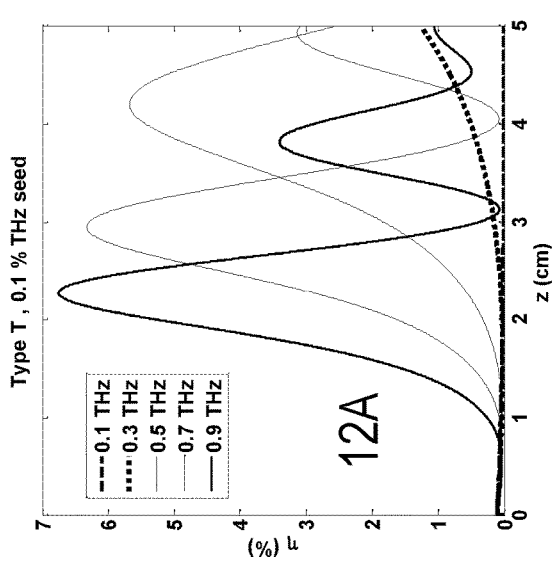
Figure 13:
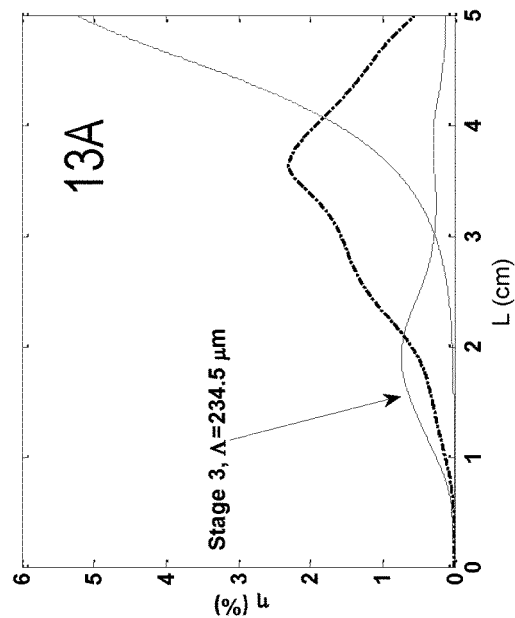

Simulations of the embodiment of FIG. 7 (Type T THz-COPA) are illustrated in FIGS. 11 and 12. For these simulations, a strong optical pump pulse and a weak THz seed instead of an optical seed are assumed. The THz seed can be generated in numerous ways as outlined above. With further examples, optical rectification of a single ultrashort pulse, chirp and delay approaches, multi-pulse approaches (second embodiment of the invention) and also a Type O THz-COPA may be used to generate the initial THz radiation.

FIG. 11 shows a peak conversion efficiency as a function of THz frequency for various initial THz seed energies, wherein the seed energy is represented as a fraction of the energy in the pump. FIG. 12A shows the conversion efficiency as a function of length for various THz frequencies, assuming only 0.1% of the energy in the seed, wherein the drop in conversion efficiency beyond a certain length is attributed to phase-mismatch caused by dispersion. In FIG. 12A, for a 1 J of optical pump, a seed of 0.1% corresponds to a mJ of THz seed. FIG. 12B shows optimal crystal lengths as a function of THz frequency for various seed levels. The crystal length was also limited to 5 cm.

The behaviors depicted in FIGS. 11 and 12 are similar to the case of using an optical seed depicted in FIGS. 9 and 10. However, it may be practically more challenging to seed large amounts of THz energy straightaway since obtaining mJ's of THz seed is a challenging prospect. Therefore, the Type O THz-COPA is more preferred. A type T COPA starting with a weak seed, may be implemented with multiple stages.

As shown in FIGS. 2 and 8, multi-stage THz-COPA apparatuses can be provided, involving the recycling of either only the optical radiation (FIG. 2) or using both the optical and THz radiation (FIG. 8). The experimentally simplest approach is to simply recycle the optical radiation as depicted in FIG. 2 due to challenges in THz beam transportation and manipulation.

Simulations of the multi-stage configuration are illustrated in FIGS. 13A and 13B, wherein FIG. 13B shows the conversion efficiency for a Type O THz-COPA with two stages and FIG. 13A shows a three stage structure leading to about 8% conversion efficiency. These are exemplary simulations and do not reflect the limit of possibilities. For example, inclusion of further stages, can lead to conversion efficiencies surpassing 10%. According to FIG. 13A, the crystal length for the first stage is set to be the optimal length, e.g. 5 cm, and the optical radiation from the first stage is basically recycled for the second stage. The QPM period of the structure is optimized (see FIG. 13B) in order to achieve the best conversion efficiency. The sensitivity of the conversion efficiency to the QPM period in FIG. 13B shows that the process is dispersion limited. The reason is that as the optical spectrum cascades, the group velocity changes and consequently a different QPM period is required to optimally phase-match the THz radiation. On the same vein, it is also possible to gradually change the grating period even within a single crystal.

Second Embodiment of the Invention

Features of the second embodiment of the invention are described with reference to FIGS. 14 to 17.

Figure 14:
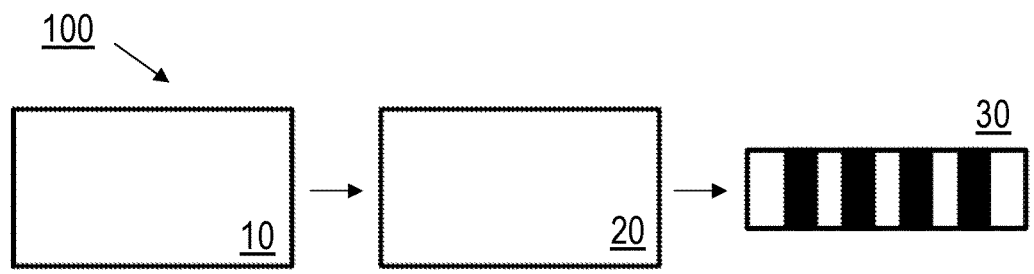
FIG. 14: a schematic illustration of the second embodiment of creating THz radiation according to the invention, employing multi-pulse input radiation.

FIG. 14 shows a schematic illustration of the THz source apparatus 100 comprising an input radiation source device 10 for generating multi-pulse optical input radiation, an imaging system 20 and a first conversion crystal device 30 for THz generation. The input radiation source device 10 is adapted for creating a sequence of ultrashort pulses having a temporal separation ($\Delta t$) equal to an integer multiple of a reciprocal of the THz frequency of the THz radiation to be generated ($\Delta t = N \cdot 1/f_{THz}$, $N=1, 2, \ldots$). With this embodiment, the multi-line frequency spectrum is provided by the optical input radiation in the first conversion crystal device 30.

Figure 15:
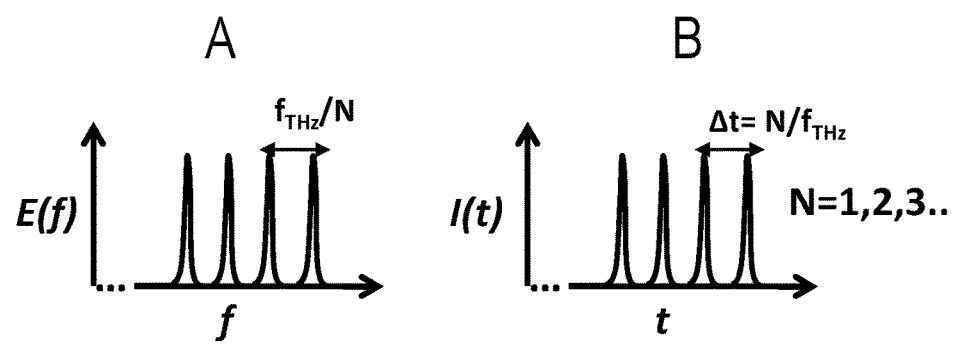
FIG. 15: graphical illustrations of the multi-pulse input radiation in frequency (A) and time (B) domain.
Figure 16:
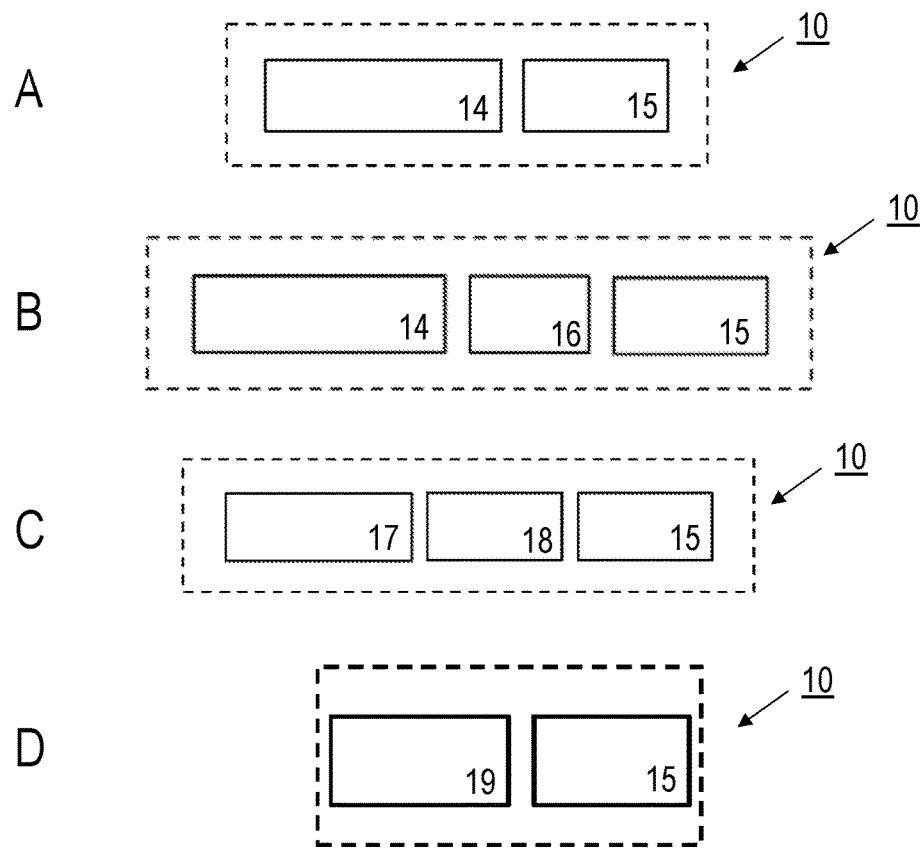
FIG. 16: schematic illustrations of input radiation source devices used in the second embodiment of FIG. 14.

The temporal pulse format and corresponding spectrum of the optical input radiation in frequency domain is illustrated in FIG. 15. The temporal pulse format (FIG. 15B) is a sequence of ultrashort pulses in which the temporal separation equals the period (or an integer multiple) of the generated THz radiation. Correspondingly, the pulse sequence includes the frequency lines separated by the THz frequency, as shown in FIG. 15A.

Each ultrashort laser pulse of the pulse sequence (FIG. 15B) generates a THz wave in the first conversion crystal device 30. Since the delay between the pulses parallels the terahertz field oscillations in time, consecutive ultrafast pulses coherently boost the THz field. In this way, the THz conversion efficiency is enhanced and a high degree of monochromacity is ensured. The amount of energy that can be packed into a single pulse is limited by the damage fluence as determined by $F_{damage} = 400\tau^{1/2}$ mJ/cm$^2$. Here, the use of multiple pulses allows us to circumvent this limitation and pack a large amount of energy cumulatively into the sequence. Thus, the gains of going from a single to multiple-pulses is particularly evident for Joule-class pump lasers.

The imaging system 20 (details not shown) comprises refractive and/or reflective optics which are configured for focusing the optical input radiation into the first conversion crystal device 30.

The first conversion crystal device 30 preferably comprises a nonlinear crystal 31, which is a quasi-phase-matched (QPM) crystal, for example periodically poled Lithium Niobate (PPLN) or Potassium Titanyl Phosphate (KTP) with periodic poling (PPKTP) or Potassium Titanyl Arsenate (KTA) with periodic poling (PPKTA).

For Joule level pumping, depending on the pulse format, large apertures of the nonlinear crystal 31, larger than 10 mm*10 mm can be provided. Commercially available quasi phase matched Lithium Niobate, Lithium Tantalate structures are produced by periodically inverting domains using a periodically applied voltage. This approach however can result in apertures only as large as 1.5 to 2 cm$^2$ at best currently. If larger apertures are needed since the damage fluence of lithium niobate empirically scales according to $F_{damage}$, in particular at a repetition rate of 1 kHz, the nonlinear crystal 31 can be constructed as described below with reference to FIG. 25. At lower repetition rates, the damage threshold is higher.

A number of methods exist for the implementation of the input radiation source device 10, which are illustrated in FIGS. 16A to 16D. According to FIG. 16A, the input radiation source device 10 comprises a multi pulse laser source 14 and a laser amplifier 15. The multi pulse laser source 14 is a high repetition rate master oscillator, with the feature of emission of a pulse train at several GHz, such as fundamentally mode-locked lasers minimizing the cavity length such as mode-locked integrated external-cavity surface emitting laser (MIXSEL) that generate currently pulse repetition rates up to around 100 GHz or by using intra-cavity interferometers enabling repetition rates 7 to 1100 GHz, or harmonically mode-locked lasers. The repetition rate corresponds to the desired terahertz frequency to be generated.

With the modified version of FIG. 16B, the input radiation source device 10 comprises the multi pulse laser source 14, a pulse picker unit 16 and the laser amplifier 15. The pulse picker unit 16 comprises e.g., an electro-optical modulator or acousto-optical modulator that selects a sequence of the high repetition rate pulses created by the multi pulse laser source 14. This burst of pulses is amplified with the laser amplifier 15 to ultra-high energies. In this way, the burst can contain higher pulse energies after amplification in a power amplifier. The repetition rate from burst to burst is typically several Hz or kHz. The pulse picker unit 16 also allows for shaping of the burst envelope.

According to FIG. 16C, the input radiation source device 10 comprises a master oscillator 17, a multi pulse generator 18 and a laser amplifier 15. The master oscillator 17 comprises an ultrashort pulsed laser oscillator emitting pulses at a repetition rate much lower than the desired terahertz frequency. Particularly for ultrashort lasers emitting pulses of several μJ to mJ the repetition rate are typically in the range of MHz to kHz. The multi-pulse generator 18 is adapted for a division of the laser pulse of the master oscillator 17 into several pulses that are separated by the inverse of the terahertz frequency or one of its harmonics. For example, the multi-pulse generator 18 several options exist a stack of birefringent crystals, semi-reflective surfaces, Gires-Tournois Interferometer mirrors, 4-f pulse shapers with phase-gratings in the Fourier-plane, acousto-optical pulse shapers or Death-star pulse shapers [8]. If the pulse-shaper provided by the multi-pulse generator 18 shows loss then it may be useful to place the pulse-shaper before the power amplifier otherwise the device can also be externally attached to the output of the laser.

Alternatively, a multi pulse generator 18 can be a device that chirps a broadband pulse and split into two parts which are overlapped with each other after an appropriate delay. The delay and the chirp may be tuned to yield the desired THz frequency.

FIG. 16D illustrates another variant, wherein the input radiation source device 10 comprises a source 19 creating and mixing multiple quasi-continuous, long duration pulses or frequency lines and a laser amplifier 15 amplifying the frequency lines. Source 19 comprises e.g., two cw single-frequency lasers that are phase-locked. Long pulses from these cw lasers can be generated by controlling the current of the laser diodes inside the lasers or alternatively the optical signal output by an external optical modulator, which can be a Pockels cell, acousto-optical or electro-optical modulators.

Figure 17:
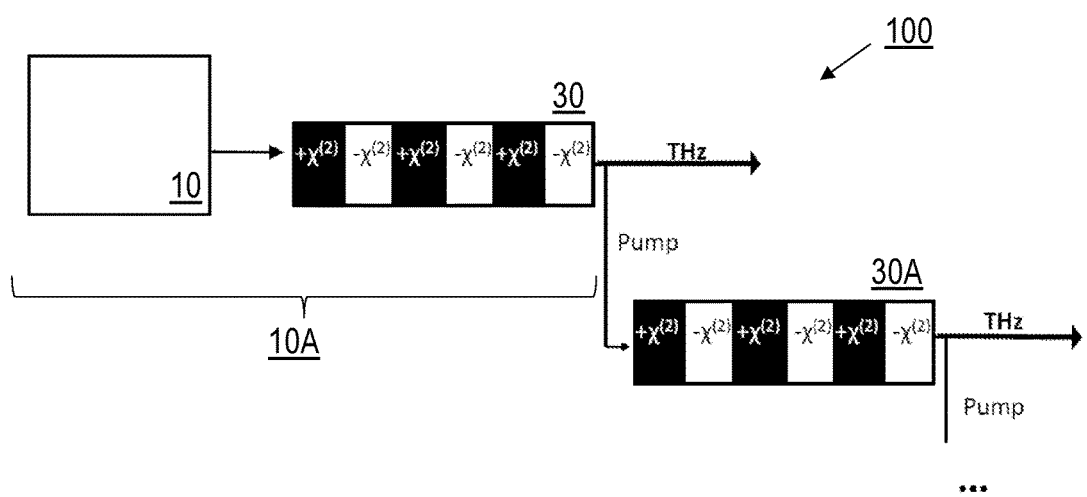
FIG. 17: a schematic illustration of a multi-stage variant of the second embodiment according to FIG. 14.

The THz source apparatus 100 of the second embodiment of the invention can be provided in a multistage configuration as shown in FIG. 17. A first stage comprises an input radiation source device 10 for generating multi-pulse optical input radiation and a first conversion crystal device 30 for THz generation as described above. The first stage provides the input radiation source device 10A of the second stage, further including a second conversion crystal device 30A. Further stages can follow.

The multistage configuration provides a recycling of the optical input radiation for subsequent stages of THz generation. Here, the pump laser system can refer to the multi-pulse laser system or any other pump laser system. Contrary to the use of the recycling the pump to generate further THz radiation proposed [7], the recycling of pump in the case of lithium niobate at the high conversion efficiency obtained with the invention is unique. The reason is that when conversion efficiencies reach the percent level, there is a repeated down conversion of the optical frequency. The fact that this distorted spectrum can still be used to generate THz radiation in subsequent stages is unprecedented. There-fore, recycling at low conversion efficiencies is quite different from recycling at large conversion efficiencies.

Numerical Simulations of the Second Embodiment

Numerical simulations of the second embodiment have been conducted using the following model formulation. The generated terahertz field at the angular frequency $\Omega$ can be calculated based on the formula presented below.

$$A(\Omega, z) = \frac{-j\Omega\chi^{(2)} F(|E_{op}(t)|^2)}{2n(\Omega)c} \left( \frac{e^{-j\Delta k z} - e^{-\frac{\alpha z}{2}}}{\frac{\alpha}{2} + j\Delta k} \right) \quad (3)$$

Here, $A(\Omega,z)$ is the terahertz electric field, $\chi^{(2)}$ is the effective second order nonlinearity, $n(\Omega)$ is the terahertz refractive index, $\alpha$ is the terahertz absorption coefficient, $\Delta k$ is the phase-mismatch between the optical pump laser and the generated terahertz and c is the speed of light in vacuum. $F(|E_{op}(t)|^2)$ is the Fourier transform of the optical pump laser pump intensity.

The optical to terahertz conversion efficiency is then readily evaluated as follows.

$$\eta(z) = \frac{\pi\varepsilon_0 c \int_0^\infty |A(\Omega, z)|^2 \, d\Omega}{F_{pump}} \quad (4)$$

Based on the formulae (3) and (4) presented above, the optical-to-terahertz conversion efficiencies for pulse formats given by $E_{op}^{(t)}$ can be calculated. Calculations are provided for the case of lithium niobate and 1030 nm optical pump wavelengths. The lists of relevant parameters are tabulated below.

| Parameter | Value |
| --- | --- |
| Second order nonlinear susceptibility $\chi^{(2)}$ | $(2/\pi)$ *336 pm/V |
| $F_{pump}$ = 50% of maximum damage Fluence | 50% of $F_{damage}$ |
| Crystal temperature T | 100 K |

In order to model the nonlinear conversion process numerically, the following 1-D equations were used.

$$\frac{dA_{THz}(\Omega, z)}{dz} = \\ -\frac{\alpha(\Omega)}{2} A_{THz}(\Omega, z) - \frac{j\Omega^2 \chi_{eff}^{(2)}(z)}{2k_{THz}(\Omega)c^2} e^{jk(\Omega)z} \int_{-\infty}^{\infty} E_{IR}(\omega + \Omega, z) E_{IR}^*(\omega, z) d\omega \quad (5)$$

$$\frac{dA_{IR}(\Omega, z)}{dz} = -\frac{j\omega^2 \chi_{eff}^{(2)}(z)}{2k_{IR}(\Omega)c^2} e^{jk(\omega)z} \int_{-\infty}^{\infty} E_{IR}(\omega + \Omega, z) E_{THz}^*(\Omega, z) d\Omega - \\ \frac{j\varepsilon_0 \omega_0 n_{IR}^2(\omega_0) n_2(z)}{2} F\{|E_{IR}(t, z)|^2 A_{IR}(t, z)\} \quad (6)$$

Equation (5) considers the evolution of the terahertz electric field envelope $A_{THz}(\Omega)$ at angular frequency $\Omega$. The first term is the absorption of the terahertz radiation. The second term corresponds to the optical rectification process which is a sum of all possible difference frequency generation processes between various optical spectral components.

Equation (6) considers the evolution of the optical electric field envelope $A_{IR}(\omega)$ at angular frequency $\omega$. The first term corresponds to the terahertz induced spectral broadening of the optical spectrum. The second term corresponds to the self-phase-modulation term.

FIG. 18A shows a sequence of pulses in time separated by a time interval corresponding to the generated terahertz frequency, FIG. 18B shows a conversion efficiency optimized over length using Eq. (3) for various transform limited pulse durations at various terahertz frequencies for a sequence of 2 (solid), 10 (dashed) and 30 (dotted) pulses for cryogenically cooled lithium niobate, and FIG. 18C shows a conversion efficiency as a function of the number of pulses in the sequence (N) for 0.3 and 0.1 THz respectively.

Ideally, the terahertz field would grow linearly with the number of pump pulses. Since the terahertz energy is proportional to the square of the electric field, the total conversion efficiency will also scale linearly with the number of pulses. However, when optical damage is taken into consideration, this growth ceases to be linear beyond a certain value of N. In FIG. 18A, a particular case of a sequence of pulses is illustrated, wherein the intensity of each pulse in the sequence is identical. In FIG. 18B, the total fluence is maintained constant at half the damage fluence value given by $F_{damage}$. As can be seen in FIG. 18B, compared to the single pulse case, the conversion efficiency continues to grow as the number of pulses is increased. Calculations illustrated in FIG. 18C reveal that conversion efficiencies in excess of 10% can be achieved at 0.3 THz and approximately 2% at 0.1 THz can be achieved.

Figure 18:
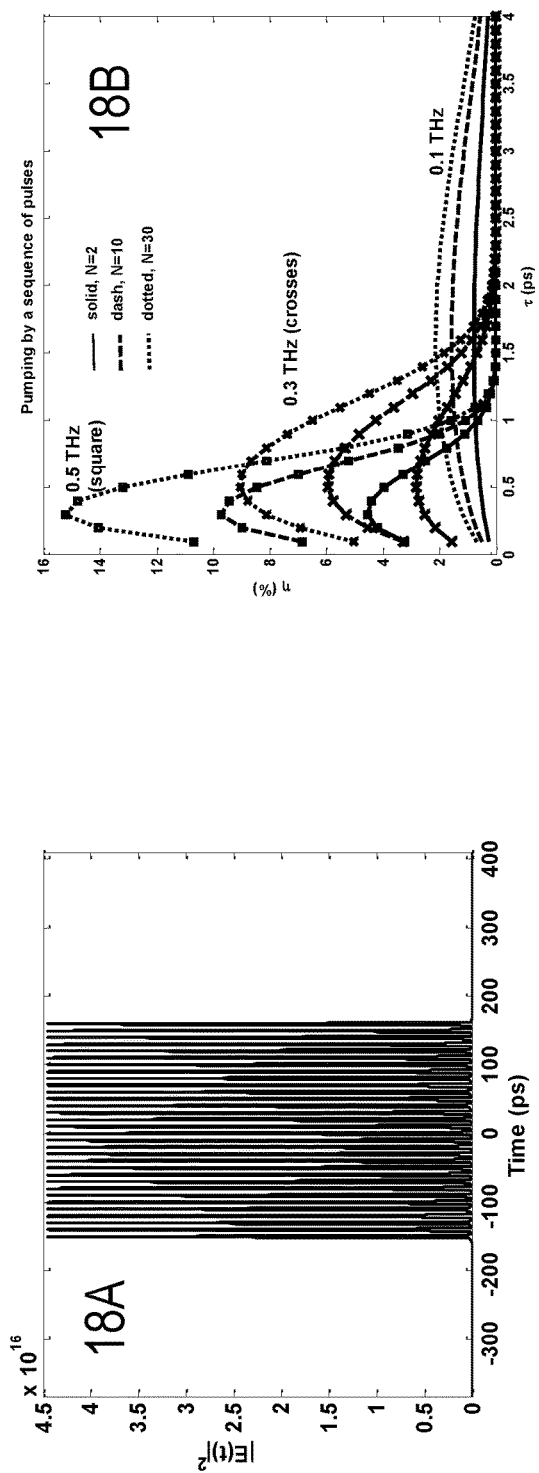
Figure 18:
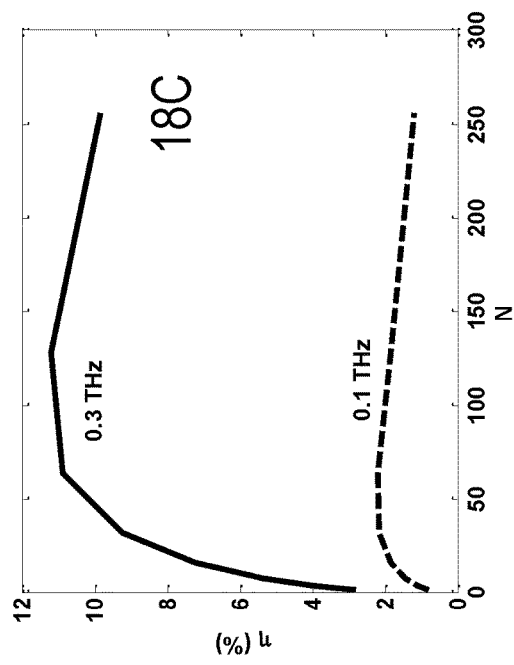

In the case of FIG. 18, the intensity of each pump pulse in the sequence is equal. However, as the initially generated terahertz radiation is absorbed the most, and the terahertz that is generated the last, exits the crystal first and consequently has the least overlap with the subsequent pulses in the sequence, the conversion efficiency can be increased if the intensity of the pump pulse in the sequence are varied as follows. For maximum efficiency gains, the pulse sequence is provided such that the THz pulses experience both the maximum coherent growth from the pulse sequence and also the least absorption. Preferably, the pulse sequence have an envelope with a Gaussian shape. Advantageously, this provides higher conversion efficiency in relation to a flat envelope over the pulse sequence.

Figure 19:
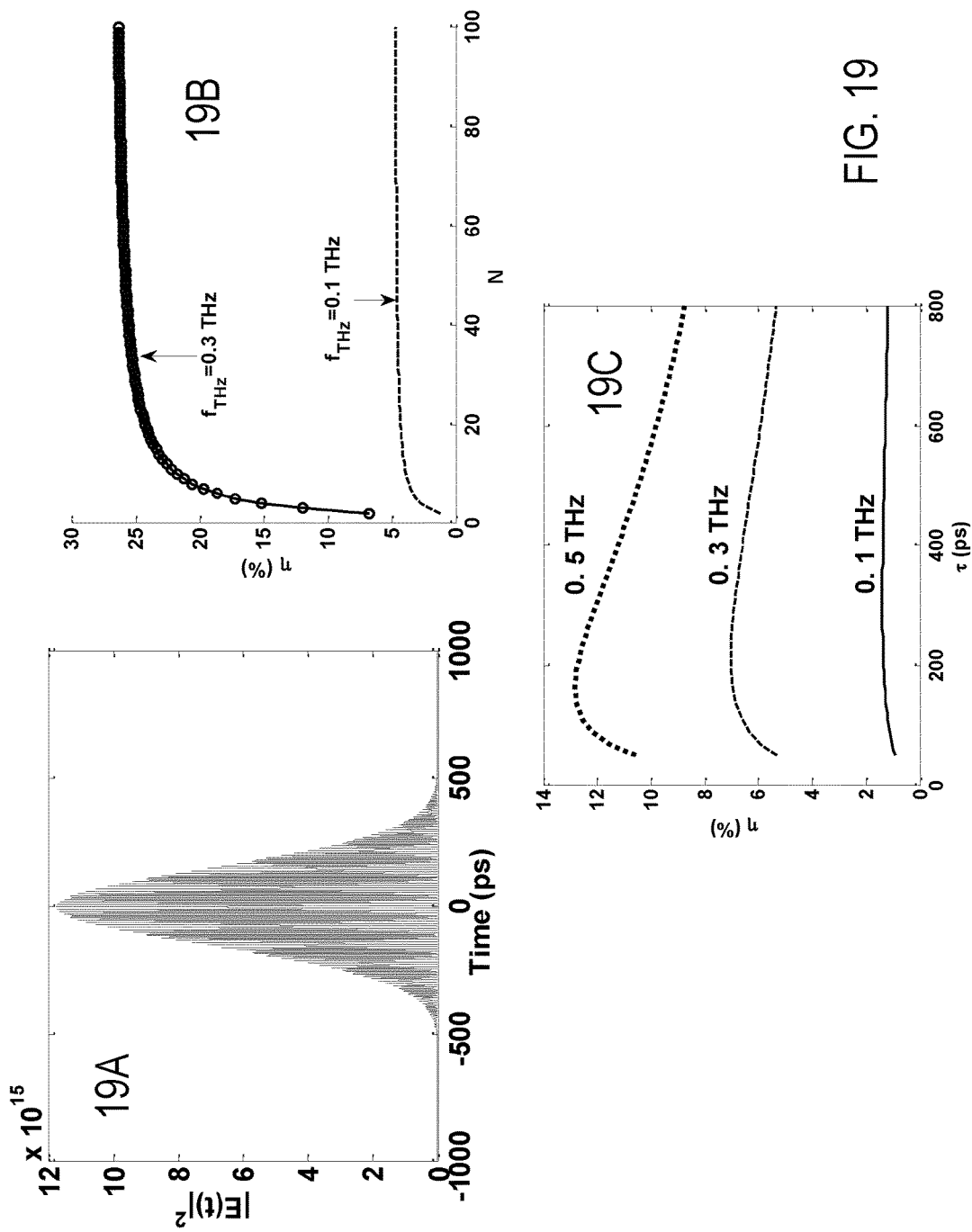

The pulse sequences have an envelope with a Gaussian profile can be generated by several methods. Firstly, a pulse splitter and stacker for ultrashort laser pulses device can be used for shaping the pulse sequence, e.g., as described in [8]. Secondly, the pulse sequence can be shaped by mixing two or more frequency lines, each corresponding to a long, quasi-continuous pulse as illustrated with reference to FIG. 19.

FIG. 19A shows a sequence of pulses separated by a time interval corresponding to the generated terahertz frequency with a Gaussian envelope. Such an intensity pattern is produced with a pair of frequency lines or quasi-continuous wave pulses of 150 ps duration each. FIG. 19C shows the conversion efficiency optimized over length for various quasi-continuous pulse durations at various terahertz frequencies for cryogenically cooled lithium niobate (100 K). FIG. 19B shows the conversion efficiency as a function of the number frequency lines N for 0.3 and 0.1 THz for cryogenically cooled lithium niobate.

Calculation of the conversion efficiency as a function of the transform limited pulse duration of each frequency line for exactly a pair of lines shown in FIG. 19C shows that conversion efficiencies as high as about 6% can be achieved using a pair of 300 ps pulses separated by 0.3 THz. In the intensity pattern of the pair of lines in FIG. 19A, they appear approximately as a train of pulses separated exactly by $(f_{THz})^{-1}=\Delta t=3.33$ ps with a Gaussian envelope. Note, due to the redistribution of the fluences within the sequence of pulses, higher conversion efficiencies compared to the case of just N pulses may be achieved. For example, for 0.3 THz, conversion efficiencies on the order of 20% and 5% for 0.1 THz are calculated as seen in FIG. 19B Thirdly, an alternative variant employs pulse shaping to an ultrashort pulse. Specifically, the ultrashort pulse is chirped, split and the copies are delayed with respect to each other, e.g., with the arrangement of FIG. 3. The order of the chirping, splitting and delay can be changed. This method is particularly applicable to broadband optical pump pulses, such as commercially available 800 nm Ti:Sapphire pulses. In this approach, a large bandwidth pulse is chirped, split into two and interfered with the appropriate delay to generate terahertz at the desired frequency.

In FIGS. 20A and 20B, the optimized conversion efficiency is shown as a function of the chirped pulse duration for 0.3 and 0.1 THz respectively in cryogenically cooled lithium niobate (100 K). FIG. 20A shows the conversion efficiency at 0.3 THz optimized over length as a function of the chirped pulse duration τ2 for various transform limited durations (30 fs, 330 fs, 600 fs and 1 ps) using the chirp and delay approach. FIG. 20B shows the conversion efficiency at 0.1 THz optimized over length as a function of the chirped pulse duration τ2 for various transform limited durations (30 fs, 330 fs, 600 fs and 1 ps) using the chirp and delay approach in cryogenically cooled lithium niobate (100 K).

FIG. 21A shows the conversion efficiency as a function of length for a train of 32 pulses of 500 fs each passing through 5 crystals with identical QPM periods Λ, phase-matched for 0.1 THz. Each, time the efficiency is about 1% or more. Therefore the cumulative efficiency is around 5%. This can be further increased by adding further stages and/or optimizing the QPM period for each stage and/or by having a single crystal with an appropriately varying value of Λ along its length. Thus, several stages of recycling the optical pump pulse can be employed as shown in FIG. 17 to yield very high cumulative conversion efficiencies. The optical spectra at the end of the fifth stage is plotted in FIG. 21B.

Figure 22:
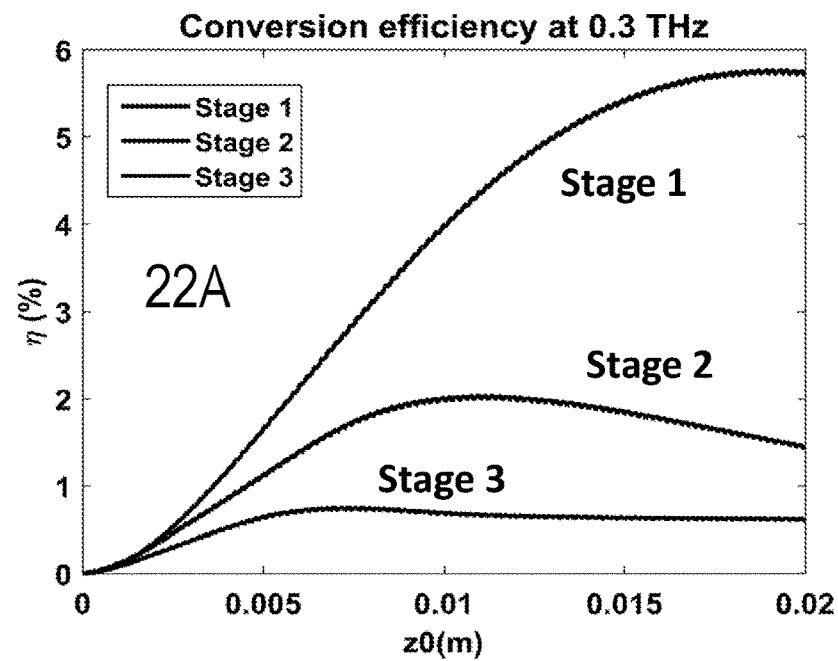
Figure 22:
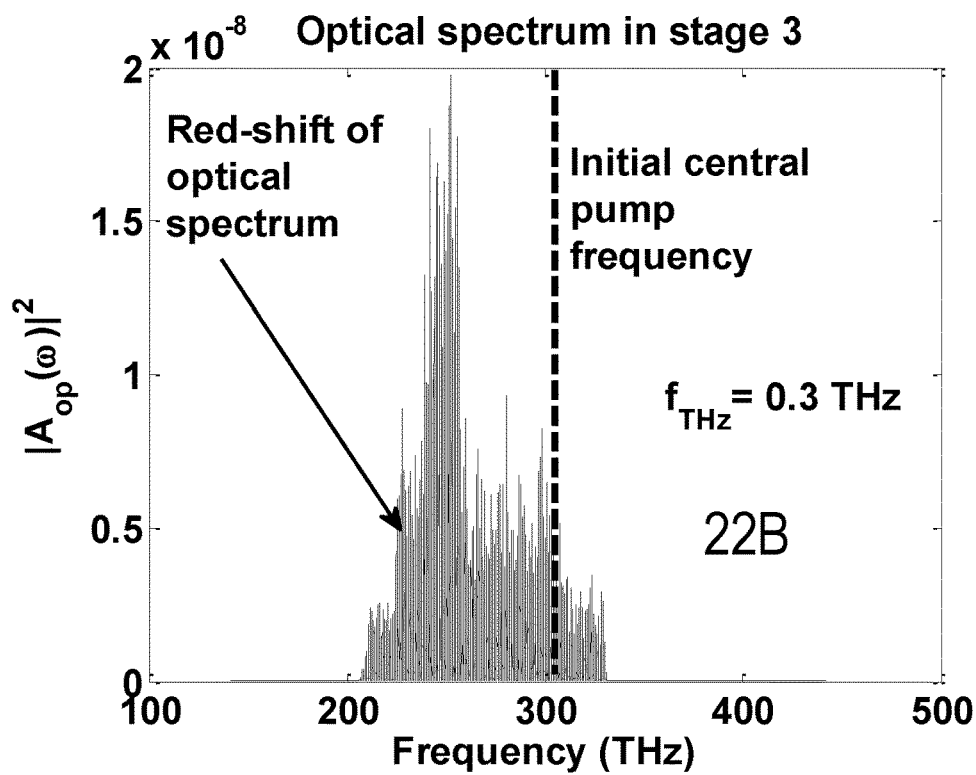

FIG. 22A shows the conversion efficiencies as a function of length for three stages of optical pulse recycling through a quasi-phase-matched crystal phase-matched for 0.3 THz, with identical QPM period value Λ in each stage. The original input optical field comprises of a train of 32 pulses of 500 fs each. In the first stage, a conversion efficiency close to 6% was achieved. In the second stage, a conversion efficiency of 2% was achieved and in the third stage, conversion efficiency close to 1% was achieved. Cumulatively, this corresponds to conversion efficiencies on the order of 9%. Once again, this does not represent a limit since further optimization of QPM periods Λ in each stage and/or addition of stages can be employed. The broadened spectrum at the end of the third stage is plotted in FIG. 22B. Thus, the approach of recycling the optical pulse can result in very high cumulative conversion efficiencies.

Configuration of the Conversion Crystal Device

Figure 23:
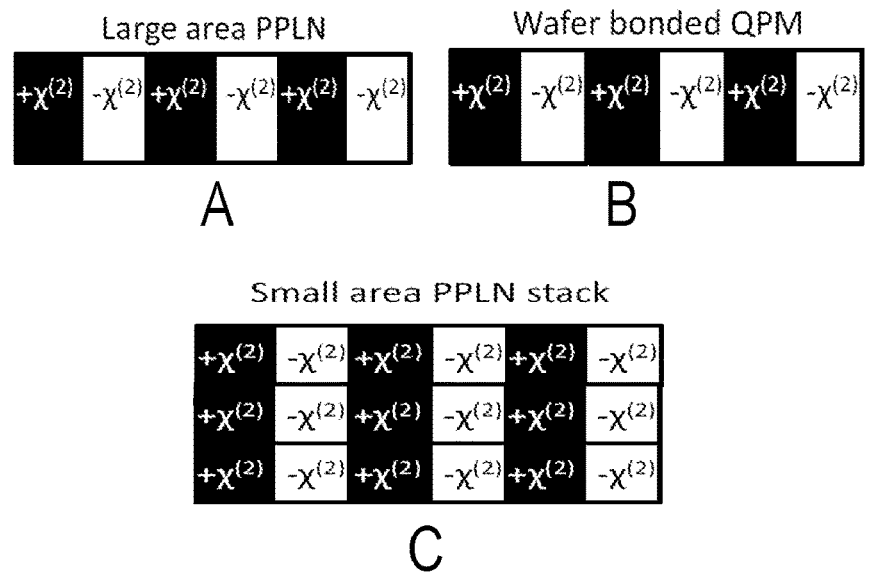
FIGS. 23 to 25: schematic illustrations of conversion crystal devices used for creating THz radiation according to the invention.
Figure 24:
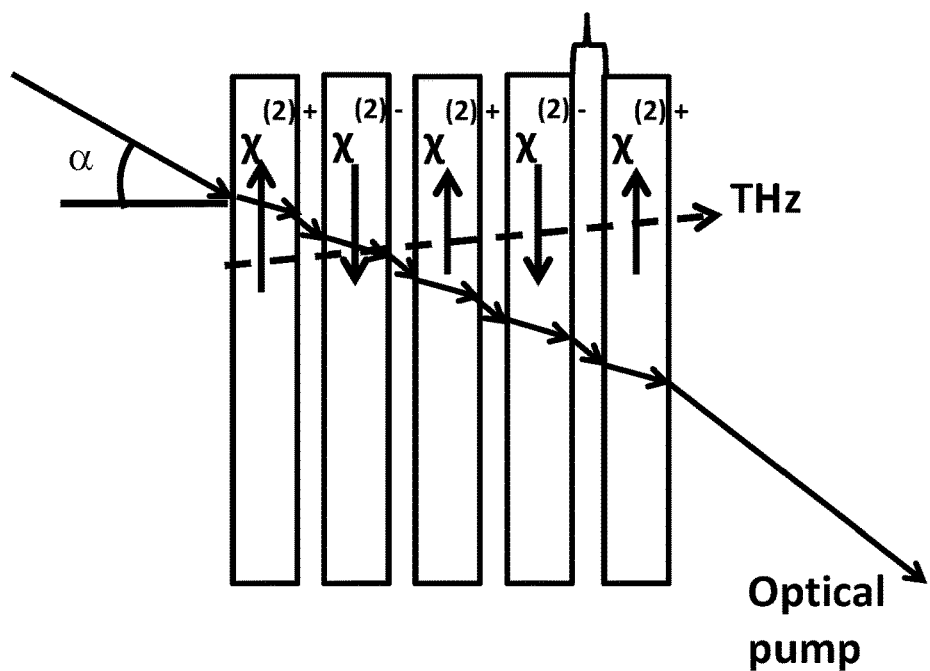
Figure 25:
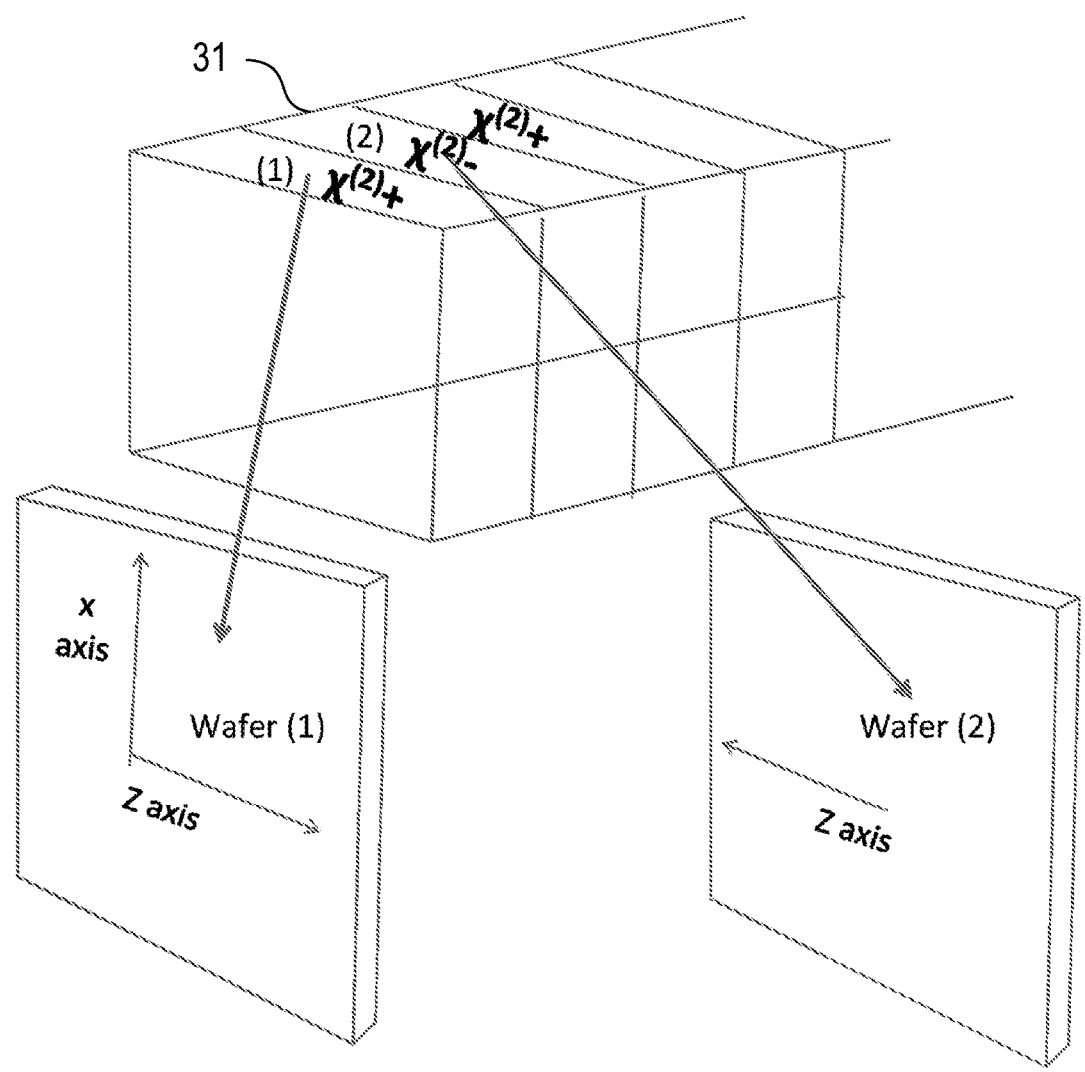
Figure 26:
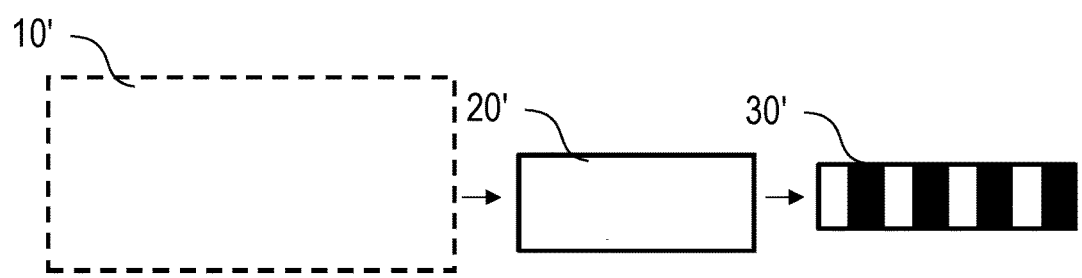
FIGS. 26 and 27: schematic illustrations of conventional techniques of creating THz radiation (prior art).
Figure 27:
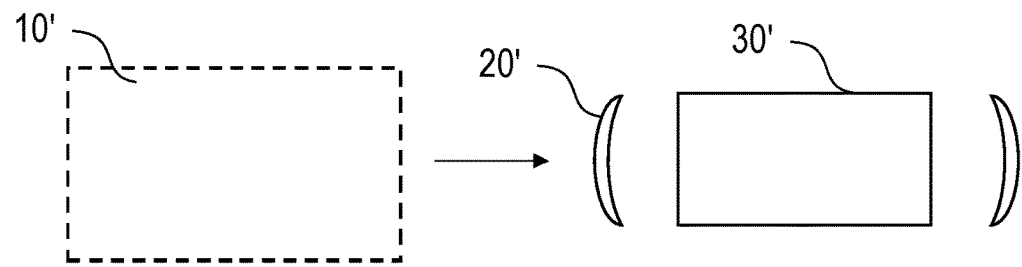

Preferred configurations of the first or further conversion crystal device(s), which can be used with the first or second embodiment of the invention are illustrated in FIGS. 23 to 25. Exemplary reference is made to periodically poled lithium niobate (PPLN) crystals. Periodically poled nonlinear crystals made of other materials as cited above can be provided correspondingly.

According to FIG. 23A, commercially available PPLN crystals with apertures of up to 1.5 to 2 cm² can be used. Alternatively, large area PPLN crystals can be made from wafers bonded to each other as shown in FIGS. 23B and 25. As a further alternative, structures formed by stacking of several smaller PPLN crystals can be used as shown in FIG. 23C.

The period of the QPM can vary along the propagation length or remain constant, and/or or multiple crystals with different but uniform periods can be used for different stages of THz generation to provide increased conversion efficiencies. Besides, collinear geometries, non-collinear geometries may also be adopted.

Non-collinear geometries may be advantageous with regard to the fabrication of structures. For instance several wafers maybe rotated by the appropriate angles and merely placed at distances smaller than the THz wavelength as shown in FIG. 24. The optical pulse can be incident at Brewster's angle α, so that all reflections for the optical beam are circumvented. The THz wave does not see interfaces much smaller than the wavelength and passes through as if there were no interfaces. This embodiment advantageously circumvents the need to adopt an expensive wafer bonding process to fabricate the QPM structures.

FIG. 25 further illustrates the structure of FIG. 23B, wherein the nonlinear crystal 31 is made of multiple wafers. The wafers are rotated to each other such that the appropriate QPM is obtained by nonlinear crystal 31. Subsequently, the wafers are bonded to each other. This structure may be referred to as wafer bonded QPM (WB-QPM) structures. In this way large aperture periodically poled crystals can be produced. The nonlinear susceptibility is a function of the relative angle between the crystal axis and incident electric field. Therefore alternate rotation of the crystal axes results in an alternating sign of the second order susceptibility. In the case of lithium niobate, the electric field along the z axis of the crystal produces maximum terahertz energy. With a practical example, a prototype of nonlinear crystal 31 has been produced with eight, 0.5 mm thick 5% Magnesium Oxide Doped Congruent lithium niobate wafers with alternating z axes diffusion bonded to each other, having an aperture of 15-20 cm². With alternative examples, the nonlinear crystal 31 can be made of stoichiometric Lithium Niobate, Congruent/Stoichiometric Lithium Tantalate, Gallium Phosphide, Potassium Titanyl Phosphate and Potassium Titanyl Arsenate wafers, with various dopants such as Magnesium Oxide or Iron or Chromium or Rubidium.

The features of the invention disclosed in the above description, the drawings and the claims can be of significance both individually as well as in combination or subcombination for the realization of the invention in its various embodiments.

What is claimed is:

1. A method of generating THz radiation, comprising the steps of:
    generating optical input radiation with an input radiation source device, wherein the optical input radiation generated with the input radiation source device comprises a first radiation component and a second radiation component including optical frequencies separated by the THz frequency of the THz radiation to be generated,
    irradiating a first conversion crystal device with the optical input radiation, wherein the first conversion crystal device is arranged in a single pass configuration, wherein the first radiation component and the second radiation component irradiate the first conversion crystal device with a mutual spatial and temporal overlap along a beam path through the first conversion crystal device, and
    generating the THz radiation having a THz frequency in the first conversion crystal device in response to the optical input radiation by an optical-to-THz-conversion process, wherein
    a multi-line frequency spectrum is provided by the optical input radiation in the first conversion crystal device, wherein the multi-line frequency spectrum is provided by beating frequencies derived from the optical frequencies of the first and second radiation components, and
    the optical-to-THz-conversion process includes cascaded difference frequency generation using the multi-line frequency spectrum.

2. The method according to claim 1, wherein the first radiation component and the second radiation component irradiate the first conversion crystal device with a collinear geometry.

3. The method according to claim 1, wherein the input radiation source device has two laser sources being locked to each other and generating the first radiation component and the second radiation component, respectively, the laser sources including:
    two continuous wave laser sources,
    two quasi-continuous wave laser sources emitting pulses having a duration in a range from 100 ps to 10 ns,
    one continuous wave laser source and one quasi-continuous wave laser source,
    two pulse laser sources emitting pulses having a transform limited duration in a range from 10 fs to 100 ps,
    one broadband chirped pulse laser source, combined with a pulse stretcher, and one pulse laser source, combined with a relative delay unit, or
    two broadband chirped pulse laser sources, combined with a relative delay unit.

4. The method according to claim 3, wherein the laser sources generate the first radiation component and the second radiation component with different output power, wherein a fraction of a weaker output power to a stronger output power is larger than 0.01% and smaller than 50%.

5. The method according to claim 1, wherein the first conversion crystal device has at least one of the features
    the first conversion crystal device is configured for quasi phase matching by bonding of wafers with periodically inverted crystal device axes or by stacking several smaller periodically poled crystal devices,
    the first conversion crystal device is configured for quasi phase matching with gradually varying quasi phase matching period along a beam path,
    the first conversion crystal device is configured for regular phase matching being phase-matched for the THz frequency of the THz radiation to be generated,
    the first conversion crystal device comprises a plurality of crystal layers being arranged at Brewsters's angle relative to the optical input radiation,
    the first conversion crystal device comprises a bulk crystal or a periodically poled crystal,
    the first conversion crystal device comprises congruent Lithium Niobate (cLN), Stoichiometric Lithium Niobate (sLN), Congruent Lithium Tantalate (cLT), Stoichiometric Lithium Tantalate (sLT), Potassium Titanyl Phosphate (KTP), potassium titanyl arsenate, Zinc Germanium Phosphide (ZGP), Cadmium Silicon Phosphide ($CdSiP_2$), or Gallium Phosphide (GaP), the first conversion crystal device includes at least one dopant, and the first conversion crystal device has a beam path length of at least one of at least 5 mm and at most 10 cm.

6. The method of claim 1, wherein the THz radiation is used for driving high energy terahertz guns and electron accelerators for coherent X-ray generation or for imaging and medical therapy, imaging, coherent diffractive imaging, spectroscopy, detecting explosives, small angle X-ray scattering, THz or Optical pump and X-ray probe time resolved spectroscopy, X-ray pump and X-ray probe time resolved spectroscopy, directional wireless communication, radar technique, driving of highly correlated quantum systems into new phases, driving of quantum information devices with transitions in the THz range, and an electromagnetic undulator.

7. A method of generating THz radiation, comprising the steps of:

generating optical input radiation with an input radiation source device, wherein the optical input radiation generated with the input radiation source device comprises a first radiation component including an optical frequency and a second radiation component including the THz frequency of the THz radiation to be generated, irradiating a first conversion crystal device with the optical input radiation, wherein the first conversion crystal device is arranged in a single pass configuration, wherein the first radiation component and the second radiation component irradiate the first conversion crystal device with a mutual spatial and temporal overlap along a beam path through the first conversion crystal device, and generating the THz radiation having a THz frequency in the first conversion crystal device in response to the optical input radiation by an optical-to-THz-conversion process, wherein a multi-line frequency spectrum is provided by the optical input radiation in the first conversion crystal device, wherein the multi-line frequency spectrum is provided by beating frequencies derived from the optical frequency of the first radiation component and the THz frequency of the second radiation component, and the optical-to-THz-conversion process includes cascaded difference frequency generation using the multi-line frequency spectrum.

8. The method according to claim 7, wherein the second radiation component having the THz frequency is generated by optical rectification of a single ultrashort optical pulse in a pump conversion crystal device, cascaded parametric amplification using the first and second radiation components, or optical rectification of a sequence of multiple pulses in a pump first conversion crystal device.

9. A method of generating THz radiation, comprising the steps of:

generating optical input radiation with an input radiation source device, wherein the optical input radiation generated with the input radiation source device comprises a sequence of optical laser pulses having a temporal separation ($\Delta t$) equal to an integer multiple of a reciprocal of the THz frequency of the THz radiation to be generated ($\Delta t = N \cdot 1/f_{THz}$, $N=1, 2, \ldots$), irradiating a first conversion crystal device with the optical input radiation, wherein the first conversion crystal device is arranged in a single pass configuration, and generating the THz radiation having a THz frequency in the first conversion crystal device in response to the optical input radiation by an optical-to-THz-conversion process, wherein a multi-line frequency spectrum is provided by the optical input radiation in the first conversion crystal device, wherein the multi-line frequency spectrum is directly provided by the optical input radiation, and the optical-to-THz-conversion process includes cascaded difference frequency generation using the multi-line frequency spectrum.

10. The method according to claim 9, wherein the first conversion crystal device comprises a periodically poled nonlinear crystal comprising a sequence of alternatingly poled crystal domains, and a domain period of the periodically poled nonlinear crystal is equal to an integer multiple of $\Lambda = c/(f_{THz}\Delta n)$, wherein $f_{THz}$ is the frequency of the THz radiation to be generated and $\Delta n$ is an absolute value of a difference between the group refractive index of the optical input and THz refractive index, $\Delta n = |n_{THz} - n_g|$.

11. The method according to claim 9, wherein the input radiation source device comprises one of an ultrashort pulse laser oscillator having a pulse repetition rate at the THz frequency of the THz radiation to be generated, an ultrafast laser oscillator and a sequence of pulses is generated by a multi pulse generator splitting and stacking incoming optical pulses, or an optical pulse inter-leaver, or pulse shaper based on chirp and delaying an optical pulse.

12. A method of generating THz radiation, comprising the steps of:

generating optical input radiation with an input radiation source device, irradiating a first conversion crystal device with the optical input radiation, wherein the first conversion crystal device is arranged in a single pass configuration, and generating the THz radiation having a THz frequency in the first conversion crystal device in response to the optical input radiation by an optical-to-THz-conversion process, wherein a multi-line frequency spectrum is provided by the optical input radiation in the first conversion crystal device, and the optical-to-THz-conversion process includes cascaded difference frequency generation using the multi-line frequency spectrum, wherein the method further includes irradiating at least one further conversion crystal device arranged at an output side of the first conversion crystal device with at least one of the optical input radiation and the THz radiation, and generating THz radiation in the at least one further conversion crystal device in response to the optical input radiation by the optical-to-THz-conversion process.

13. The method according to claim 12, wherein
the first conversion crystal device and the at least one further conversion crystal device are configured for quasi phase matching, wherein
the first conversion crystal device and the at least one further conversion crystal device have different quasi phase matching periods.

14. A method of generating THz radiation, comprising the steps of:
generating optical input radiation with an input radiation source device,
irradiating a first conversion crystal device with the optical input radiation, wherein the first conversion crystal device is arranged in a single pass configuration, and
generating the THz radiation having a THz, frequency in the first conversion crystal device in response to the optical input radiation by an optical-to-THz-conversion process, wherein
a multi-line frequency spectrum is provided by the optical input radiation in the first conversion crystal device, and
the optical-to-THz-conversion process includes cascaded difference frequency generation using the multi-line frequency spectrum, wherein
each conversion crystal device is cooled with a cooling device.

15. A THz source apparatus, being configured for generating THz radiation, comprising
an input radiation source device being arranged for generating optical input radiation, and
a first conversion crystal device being arranged to be irradiated with the optical input radiation, wherein
the first conversion crystal device is arranged in a single pass configuration and for generating the THz radiation having a THz frequency in response to the optical input radiation by an optical-to-THz-conversion process, wherein
the input radiation source device and the first conversion crystal device are configured such that a multi-line frequency spectrum is provided by the optical input radiation in the first conversion crystal device and the optical-to-THz-conversion process includes cascaded difference frequency generation of the optical input radiation using the multi-line frequency spectrum, wherein
the input radiation source device is arranged for generating a first radiation component including an optical frequency and a second radiation component including an optical frequency separated from the first radiation component optical frequency by the TEL frequency of the THz radiation to be generated or including the THz frequency of the THz radiation to be generated, wherein the first radiation component and the second radiation component irradiate the first conversion crystal device with a mutual spatial and temporal overlap along a beam path through the first conversion crystal device, and
the input radiation source device has two laser sources locked to each other and configured to generate the first radiation component and the second radiation component, respectively, the laser sources including
two continuous wave laser sources,
two quasi-continuous wave laser sources configured to emit pulses having a duration in a range from 100 ps to 10 ns,
one continuous wave laser source and one quasi-continuous wave laser source,
two pulse laser sources configured to emit pulses having a duration in a range from 10 fs to 100 ps,
one broadband chirped puke laser source, combined with a pulse stretcher, and one pulse laser source, combined with a relative delay unit, or
two broadband chirped pulse laser sources, combined with a relative delay unit.

16. The THz source apparatus according to claim 15, wherein the input radiation source device is configured for generating the second radiation component having the THz frequency by
optical rectification of a single ultrashort optical pulse in a pump conversion crystal device,
cascaded parametric amplification using the first and second radiation components, or
optical rectification of a sequence of multiple pulses in a pump first conversion crystal device.

17. A THz source apparatus, being configured for generating THz radiation, comprising
an input radiation source device being arranged for generating optical input radiation, and
a first conversion crystal device being arranged to be irradiated with the optical input radiation, wherein
the first conversion crystal device is arranged in a single pass configuration and for generating the THz radiation having a THz frequency in response to the optical input radiation by an optical-to-THz-conversion process, wherein
the input radiation source device and the first conversion crystal device are configured such that a multi-line frequency spectrum is provided by the optical input radiation in the first conversion crystal device and the optical-to-THz-conversion process includes cascaded difference frequency generation of the optical input radiation using the multi-line frequency spectrum, wherein
the input radiation source device is arranged for generating a sequence of optical laser pulses having a temporal separation ($\Delta t$) equal to an integer multiple of a reciprocal of the THz frequency of the THz radiation to be generated ($\Delta t = N \cdot 1/f_{THz}$, $N=1, 2, \ldots$).

18. A THz source apparatus, being configured for generating THz radiation, comprising
an input radiation source device being arranged for generating optical input radiation, and
a first conversion crystal device being arranged to be irradiated with the optical input radiation, wherein
the first conversion crystal device is arranged in a single pass configuration and for generating the THz radiation having a THz frequency in response to the optical input radiation by an optical-to-THz-conversion process, wherein
the input radiation source device and the first conversion crystal device are configured such that a multi-line frequency spectrum is provided by the optical input radiation in the first conversion crystal device and the optical-to-THz-conversion process includes cascaded difference frequency generation of the optical input radiation using the multi-line frequency spectrum, wherein
the input radiation source device comprises one of
an ultrashort pulse laser oscillator having a pulse repetition rate at the THz frequency of the THz radiation to be generated, an ultrafast laser oscillator and a sequence of pulses is generated by a multi pulse generator splitting and stacking incoming optical pulses, and an optical pulse inter-leaver, or pulse shaper based on chirp and delaying an optical pulse.

19. A THz source apparatus, being configured for generating THz radiation, comprising an input radiation source device being arranged for generating optical input radiation, and a first conversion crystal device being arranged to be irradiated with the optical input radiation, wherein the first conversion crystal device is arranged in a single pass configuration and for generating the THz radiation having a THz frequency in response to the optical input radiation by an optical-to-THz-conversion process, wherein the input radiation source device and the first conversion crystal device are configured such that a multi-line frequency spectrum is provided by the optical input radiation in the first conversion crystal device and the optical-to-THz-conversion process includes cascaded difference frequency generation of the optical input radiation using the multi-line frequency spectrum further comprising at least one further conversion crystal device being arranged at an output side of the first conversion crystal device to be irradiated with at least one of the optical input radiation and the THz radiation, wherein the at least one further conversion crystal device is arranged for generating THz radiation in response to the optical input radiation by the optical-to-THz-conversion process.

* * * * *